US008129032B2

(12) United States Patent
Dabadie et al.

(10) Patent No.: US 8,129,032 B2
(45) Date of Patent: Mar. 6, 2012

(54) COATING COMPOSITIONS, COATED SUBSTRATES AND HERMETIC SEALS MADE THEREFROM HAVING IMPROVED LOW TEMPERATURE SEALING AND HOT TACK PROPERTIES

(75) Inventors: Thierry Jean-Luc Dabadie, Luxembourg (LU); Bruno R. Gringoire, Rachecourt (BE); Pang-Chia Lu, Pittsford, NY (US); Jean-Pierre Frognet, Virton (BE); Brad M. Moncla, Lake Jackson, TX (US); Matthew J. Kalinowski, Freeland, MI (US)

(73) Assignee: ExxonMobil Oil Corporation, Irving, TX (US)

( * ) Notice: Subject to any disclaimer, the term of this patent is extended or adjusted under 35 U.S.C. 154(b) by 1070 days.

(21) Appl. No.: 12/024,478

(22) Filed: Feb. 1, 2008

(65) Prior Publication Data

US 2009/0194450 A1    Aug. 6, 2009

(51) Int. Cl.
*B32B 27/32* (2006.01)
*C08J 3/03* (2006.01)

(52) U.S. Cl. ....... 428/523; 428/35.7; 524/500; 524/501; 427/180

(58) Field of Classification Search ............. 524/500, 524/501, 276; 428/523
See application file for complete search history.

(56) References Cited

U.S. PATENT DOCUMENTS

| | | | | |
|---|---|---|---|---|
| 2,653,919 A * | 9/1953 | Hunter | ........................ | 524/238 |
| 3,389,109 A * | 6/1968 | Harmon et al. | ............... | 523/332 |
| 3,418,265 A * | 12/1968 | McClain | ....................... | 524/364 |
| 3,422,049 A * | 1/1969 | McClain | ....................... | 528/326 |
| 3,432,483 A * | 3/1969 | Beatty et al. | .................. | 528/494 |
| 3,644,258 A * | 2/1972 | Moore et al. | .................. | 524/162 |
| 4,123,403 A * | 10/1978 | Warner et al. | ................. | 523/313 |
| 4,384,056 A * | 5/1983 | Schmidt et al. | ............... | 523/221 |
| 4,539,361 A * | 9/1985 | Siol et al. | ....................... | 524/458 |
| 5,352,720 A * | 10/1994 | Aydin et al. | .................... | 524/162 |
| 5,387,635 A * | 2/1995 | Rowland et al. | .............. | 524/379 |
| 5,419,960 A | 5/1995 | Touhsaent | | |
| 5,539,021 A * | 7/1996 | Pate et al. | ...................... | 523/335 |
| 5,574,091 A * | 11/1996 | Walther et al. | ................ | 524/570 |
| 5,688,842 A * | 11/1997 | Pate et al. | ...................... | 523/335 |
| 5,798,410 A * | 8/1998 | Walther et al. | ................ | 524/570 |

(Continued)

FOREIGN PATENT DOCUMENTS

JP    2003-183453    3/2003

(Continued)

OTHER PUBLICATIONS

"Sealing in Brand Equity with Hot Tack", by James R. De Garavilla, DuPont Packaging, dated Sep. 10, 2005 (http://www.dupont.com/packaging/knowledge/tech0004.html).

(Continued)

*Primary Examiner* — Michele L Jacobson
(74) *Attorney, Agent, or Firm* — Kevin M. Faulkner; Darryl M. Tyus

(57) ABSTRACT

Novel coated substrates are disclosed wherein a substrate is coated with a coating composition that forms good hermetic seals at very low temperatures and exhibits good blocking and slip characteristics. Such coating composition is comprised of an aqueous dispersion of a substantially non-polar copolymer of ethylene and an alpha-olefin having less than 20 carbon atoms, and an additive selected from the group consisting of an anti-blocking and slip agent, a coalescent and wetting agent, and mixtures thereof.

28 Claims, 1 Drawing Sheet

U.S. PATENT DOCUMENTS

| | | | |
|---|---|---|---|
| 6,512,024 B1 | 1/2003 | Lundgard et al. | |
| 6,599,622 B1* | 7/2003 | Chu et al. | 428/323 |
| 6,673,451 B2* | 1/2004 | Bardman et al. | 428/402.22 |
| 6,852,792 B1* | 2/2005 | Capendale et al. | 524/556 |
| 6,858,765 B2* | 2/2005 | Toyoda | 585/9 |
| 6,900,258 B2* | 5/2005 | Lin et al. | 524/284 |
| 7,153,902 B2* | 12/2006 | Altes et al. | 524/801 |
| 7,279,513 B2* | 10/2007 | Zhang et al. | 524/47 |
| 7,528,080 B2* | 5/2009 | Prieto et al. | 442/103 |
| 7,763,676 B2* | 7/2010 | Moncla et al. | 524/523 |
| 7,803,865 B2* | 9/2010 | Moncla et al. | 524/523 |
| 7,879,189 B2* | 2/2011 | Dyer et al. | 162/168.1 |
| 7,935,755 B2* | 5/2011 | Moncla et al. | 524/523 |
| 7,947,776 B2* | 5/2011 | Moncla et al. | 524/523 |
| 2005/0014885 A1* | 1/2005 | Katsuta et al. | 524/501 |
| 2005/0100754 A1 | 5/2005 | Moncla et al. | |
| 2005/0271888 A1 | 12/2005 | Moncla et al. | |
| 2006/0029824 A1* | 2/2006 | Gringoire et al. | 428/522 |
| 2007/0141323 A1 | 6/2007 | Wevers et al. | |
| 2007/0141933 A1 | 6/2007 | Wevers et al. | |
| 2007/0160833 A1* | 7/2007 | Maak et al. | 428/343 |
| 2008/0000598 A1 | 1/2008 | Dyer et al. | |
| 2008/0009586 A1 | 1/2008 | VanSumeren et al. | |
| 2008/0176968 A1* | 7/2008 | VanSumeren et al. | 521/97 |
| 2009/0197022 A1* | 8/2009 | Lu et al. | 428/29 |
| 2010/0048784 A1* | 2/2010 | Moncla et al. | 524/284 |
| 2010/0137501 A1* | 6/2010 | Moncla et al. | 524/539 |
| 2010/0143651 A1* | 6/2010 | Silvis et al. | 428/141 |
| 2011/0008623 A1* | 1/2011 | Dhodapkar et al. | 428/407 |
| 2011/0071244 A1* | 3/2011 | Moncla et al. | 524/284 |

FOREIGN PATENT DOCUMENTS

| | | |
|---|---|---|
| WO | WO00/71608 | 11/2000 |
| WO | WO00/71609 | 11/2000 |
| WO | WO2005/026275 | 3/2005 |
| WO | WO2005/085331 | 9/2005 |
| WO | WO2006/022972 | 3/2006 |
| WO | WO2007/008558 | 1/2007 |

OTHER PUBLICATIONS

"Elvanol in Water-Based Adhesives", Dupont Packaging, dated Sep. 8, 2005 (http://www2.dupont.com/Elvanol/en_US/assets/downloads/elvanol_in_water_based_adhesives.pdf).

* cited by examiner

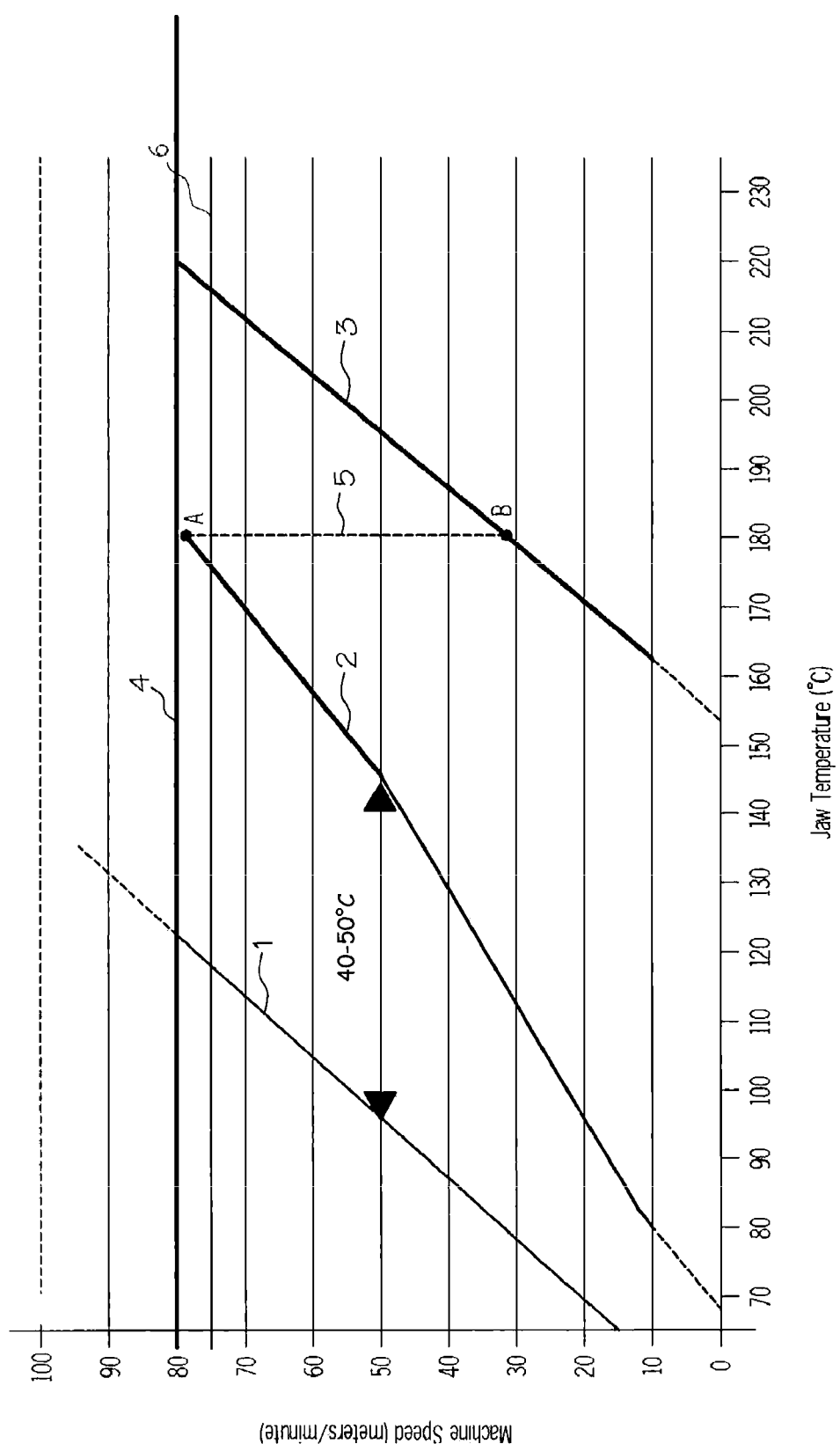

COATING COMPOSITIONS, COATED SUBSTRATES AND HERMETIC SEALS MADE THEREFROM HAVING IMPROVED LOW TEMPERATURE SEALING AND HOT TACK PROPERTIES

FIELD OF THE INVENTION

The present invention relates to novel coating compositions, substrates coated with the coating compositions, and hermetic seals made from the coated substrates. The hermetic seals of this invention exhibit improved low temperature sealing and hot tack properties as well as improved antiblocking characteristics. This invention also relates to packages which comprise such hermetic seals as well as to methods for making the hermetic seals.

BACKGROUND OF THE INVENTION

Consumer packaging is used to control the air, moisture, light environments and to protect the integrity of a product. In the case of a food product, such packaging is used to preserve the freshness by providing a barrier to passage of air, water vapor or other contaminants, especially gaseous contaminants. This type of consumer packaging, such as bags and packages, is commonly produced by high-speed packaging equipment from paper, aluminum foil, single and multi-layer films, and the like.

In the case of multi-layer films for consumer packaging applications, it is important that such films have optimum barrier properties and produce a hermetic seal when formed using high-speed packaging equipment, such as horizontal form/fill/seal (HFFS) packaging equipment and vertical form/fill/seal (VFFS) packaging equipment. Such multi-layer films have been developed which employ oriented polypropylene (OPP) as a core layer and typically include one or more additional layers, such as coatings, co-extrusions, laminations, and combinations thereof.

These additional layers are added to the core layer of an OPP film in an effort to improve the barrier properties and sealing characteristics over that obtained with the core layer of an OPP film alone. Additives may be added to these layers to further enhance other film characteristics, such as antiblocking, antistatic slip, and coefficient of friction. When a film is processed on high-speed packaging equipment, the antiblocking and slip characteristics of the film are very important. There may be undesirable adhesion between adjacent film layers, referred to as blocking, when a film is unwound from a roll. The coefficient of friction between the film and high-speed packaging equipment surfaces may be too high. Thus, a film that exhibits good antiblocking characteristics and a low coefficient of friction for good processability on high-speed packaging equipment is desirable.

Also, the sealing characteristics of a film processed on high-speed packaging equipment are very important. HFFS and VFFS equipment, for example, includes sealing operations at various stages. In HFFS equipment, packages are formed by folding the film through a forming box and sealing along the length by hot wheels, hot bars or other devices, and then sealing at both ends in a transverse direction by sealing jaws. Cutting knives located in the sealing jaws are used to separate the individual packages. In VFFS equipment, individual packages are formed by forming the film around a forming collar and the continuous web created thereby is immediately sealed together by a longitudinal sealing jaw. In addition, there is a second sealing operation in VFFS equipment that consists of a combined top-sealing section and bottom-sealing section, with a package cut-off operation in between. The top-sealing section seals the bottom of an empty package suspended from the forming collar while the bottom section seals the top of a filled package. The package cut-off operation separates the individual packages.

In hot seal packaging applications for HFFS and VFFS equipment, the seal is formed by the application of heat and pressure. In cold seal operations, the seal is formed by first applying an "adhesive" to the film area to be sealed, followed by the application of pressure by the sealing jaws.

Uncoated thermoplastic films, such as coextruded OPP films, for example, have higher than desired hot seal temperatures and a narrower than desired heat-sealing ranges for very high-speed packaging applications. Such films often exhibit a tendency to disorient and shrink when they are heated to form a hermetic seal. In an effort to address these problems, film coatings have been developed that provide improved heat-sealing characteristics, such as reduced sealing temperatures, for such thermoplastic films.

Current efforts in the hot seal packaging industry have been focused on developing thermoplastic films which provide good seal strength immediately after a hermetic seal is formed at increasingly lower temperatures and faster machine speeds in HFFS and VFFS equipment. One property in which to evaluate such hermetic seals immediately after seal formation is "hot tack." Hot tack has been defined as the capability of a heat-seal joint to hang together when it is stressed, while still hot from the sealing operation, or more technically speaking, the sum of the cohesive strength of a sealant material as well as its adhesive strength to the remaining elements of the multilayer structure while in the heat-seal temperature range from an article entitled "Sealing in Brand Equity with Hot Tack", by James R. De Garavilla, DuPont Packaging, dated 10 Sep. 2005 (http://www.dupont.com/packaging/knowledge/tech0004.html). Hot tack differs from "heat seal initiation temperature" which measures the temperature at which a heat seal begins to form with a minimum defined strength of such seal.

At increased machine speeds, hot seal packaging may compete with higher cost and more complex cold seal packaging. Innovations to date have been primarily concerned with coatings that form good hermetic seals at low temperatures when applied to thermoplastic films. While coatings based on ethylene and acrylic acid copolymers exhibit good low temperature sealing and hot tack properties, such coatings do not exhibit sufficiently good sealing characteristics to significantly increase machine speed to match cold seal coated film performance. While acrylic-based and polyurethane-based coatings exhibit good sealing, blocking and slip characteristics, such coatings often exhibit unacceptable hot tack properties.

Coating compositions comprised of a first polymer dispersed in a liquid and having a mean particle size of less than or equal to 5000 nanometers were coated onto substrates (e.g., multilayer films) and formed into packages. The hermetic seals produced exhibited good low temperature sealing properties, but lacked desired hot tack properties. Similarly, coating compositions comprised of a second polymer dispersed in a liquid and having a mean particle size of less than or equal to 50 nanometers were coated onto substrates (e.g., multilayer films) and formed into packages. The hermetic seals produced exhibited good low temperature sealing and hot tack properties, but lacked desired antiblocking properties.

Therefore, there is a need for coating compositions which when coated onto substrates (e.g., multilayer films) exhibit improved antiblocking characteristics. When the coated substrates are used to form hermetic seals, the coated substrates exhibit improved low temperature sealing properties. When the hermetic seals comprise a package for a product, the hermetic seals exhibit improved hot tack properties. The invention disclosed herein meets these and other needs.

PRIOR PATENTS AND PUBLICATIONS

The following references may be pertinent to this invention disclosed herein.

U.S. Pat. No. 5,419,960 of Touhsaent of the Mobil Oil Corporation discloses low temperature seal coatings wherein a polymer film, such as oriented isotactic polypropylene, is coated with a composition comprising a copolymer of about 65 to 95 wt % ethylene and about 5 to 35 wt % of acrylic or methacrylic acid, based on the weight of the polymer, in which about 2 to 80% of the carboxylate groups are neutralized with metal ions from Group IA, IIA or IIB of the Periodic Table, preferably sodium ions.

PCT Publication WO 2005/026275 of Gringoire et al. of the ExxonMobil Oil Corporation discloses novel coated substrates wherein a substrate is coated with a coating composition that forms good hermetic seals at very low temperatures and exhibits good blocking and slip characteristics. Such coating composition is comprised of an aqueous dispersion of a substantially non-polar copolymer of ethylene and an alpha-olefin having less than 20 carbon atoms, and an additive selected from the group consisting of an anti-blocking and slip agent, a coalescent and wetting agent, and mixtures thereof.

U.S. Publication 2005/0100754 A1 of Moncla et al. of The Dow Chemical Company discloses aqueous dispersions comprising at least one thermoplastic resin, at least one dispersing agent, and water, wherein the dispersion has a pH of less than 12, including aqueous dispersions having a volume average particle size of less than about 5 microns (5000 nanometers). Some aqueous dispersions disclosed have an average particle size of less than about 1.5 microns (1500 nanometers) and in the range from about 0.05 to about 1.5 microns (50 to about 1500 nanometers). Disclosed thermoplastic resins include alpha-olefin interpolymers of ethylene with at least one comonomer selected from the group consisting of $C_4$-$C_{20}$ linear, branched or cyclic dienes, or an ethylene vinyl compound, and others. Disclosed thermoplastic resins also include alpha-olefin interpolymers of propylene with at least one comonomer selected from the group consisting of $C_4$-$C_{20}$ linear, branched or cycle dienes, and others. Disclosed are any suitable dispersing agents, including ethylene-carboxylic acid polymers, and their salts, such as ethylene-acrylic acid copolymers or ethylene-methacrylic acid copolymers, and others. It is disclosed that the dispersing agents may be combined and comprises less than about 4 wt % based on the weight of the thermoplastic resin. Also disclosed in US2005/0100754 is that the aqueous dispersions may be coated onto a substrate, including thermoplastic films such as polyethylene terephthalate, polyethylene, and others.

PCT Publication WO 2005/085331 A1 of Moncla et al. of The Dow Chemical Company discloses aqueous dispersions comprising at least one thermoplastic resin, at least one dispersing agent, and water, wherein the dispersion has a pH of less than 12, including aqueous dispersions having a volume average particle size of less than about 5 microns (5000 nanometers). Some aqueous dispersions disclosed have an average particle size of less than about 1.5 microns and in the range from about 0.05 microns to about 1.5 microns. Disclosed thermoplastic resins include alpha-olefin interpolymers of ethylene with at least one comonomer selected from the group consisting of $C_4$-$C_{20}$ linear, branched or cyclic dienes, or an ethylene-vinyl compound, and others. Disclosed thermoplastic resins also include alpha-olefin interpolymers of propylene with at least one comonomer selected from the group consisting of $C_4$-$C_{20}$ linear, branched or cyclic dienes, and others. Disclosed dispersing agents include ethylene-carboxylic acid polymers, and their salts, such as ethylene-acrylic acid copolymers or ethylene-methacrylic acid copolymers, and others. The dispersing agent comprises less than about 4 wt % based on the weight of the thermoplastic resin.

Also disclosed in WO 2005/085331 A1 is a method for forming a heat sealable coating on a substrate, wherein the substrate is formed from at least one oriented polymer. Disclosed substrates include thermoplastic films, such as propylene homopolymers and random copolymers and oriented nylon. The method includes depositing an aqueous polymer dispersion on the substrate, wherein the aqueous polymer dispersion includes at least one thermoplastic resin, at least one dispersing agent, and water, wherein the dispersion has a pH of less than 12, and drying the dispersion to form a first layer. The dispersion has an average volume diameter particle size of less than about 5 microns. Disclosed are heat seal initiation temperatures of 80° C. or below, 75° C. or below, 70° C. or below, and 65° C. or below.

SUMMARY OF THE INVENTION

The present invention relates to novel coating compositions, substrates coated with the coating compositions, and packages having hermetic seals made from the coated substrates. The hermetic seals of this invention exhibit improved low temperature sealing and hot tack properties. This invention also relates to methods for making the hermetic seals.

Aspects of this invention relate to coating compositions which comprise:

(a) a first liquid, (b) a first polymer dispersed in the first liquid, the first polymer having a mean particle size less than or equal to 5000 nanometers; and (c) a second polymer dispersed in the first liquid, the second polymer having a mean particle size less than or equal to 50 nanometers, the second polymer comprises at least 5 wt % of the total combined weight of the first polymer and the second polymer.

In one or more embodiments, the first polymer comprises a first copolymer, and the second polymer comprises a second copolymer.

In one or more embodiments, the coating compositions further comprise a dispersing agent. When the liquid comprises water, the coating compositions comprise an aqueous dispersion.

In another embodiment, the first polymer of the coating compositions are dispersed in a first aqueous dispersion and the second copolymer is dispersed in a second aqueous dispersion.

In another embodiment, the coating compositions further comprise a slip agent. The slip agent has a mean particle size of less than 130 nanometers, or less than 100 nanometers, or less than 70 nanometers, or less than 50 nanometers. The slip agent may comprise a polyethylene wax, a paraffin wax, a microcrystalline wax, a beeswax, a carnauba wax, a montan wax, a candelilla wax, a synthetic wax, or mixtures thereof.

Other aspects of this invention are substrates coated with a coating composition described herein to form coated substrates. In an embodiment of this invention, the substrate is selected from the group consisting of a polyolefin film, a polypropylene film, a polyethylene terephthalate film, a cellophane film, a polyethylene film, paper, aluminum foil, a single-layer thermoplastic film, a multi-layer thermoplastic film, and a polyamide film. The substrates may be coated with the coating compositions described herein on one or both outermost surfaces of the substrates. The multi-layer film substrates that may be coated with the coating compositions described herein, may be comprised of a core layer, one or more tie layers (i.e., a first tie layer and/or a second tie layer), one or more skin layers (i.e., a first skin layer and/or a second skin layer), and may include additives. Such multi-layer films may be oriented in one or more directions and subjected to surface treatments and metallization treatment. One or both surfaces of such multi-layer film may receive a top coating or primer. These multi-layer films may be used as mono-webs or used in laminations.

Still other aspects of this invention are substrates coated with a coating composition described herein to form coated substrates, wherein a first portion of the coated surface is sealed under suitable sealing conditions to a second portion of the coated surface to form a hermetic seal. Such suitable sealing conditions include the minimum sealing temperatures and the hot tack temperature ranges, described herein.

Still yet other aspects of this invention are the coated substrates of this invention which are formed into packages adapted to contain a product; wherein the package comprises at least one hermetic seal comprised of a first portion of the coated substrate sealed under suitable sealing conditions to a second portion of the coated substrate. Such suitable sealing conditions include the minimum sealing temperatures and the hot tack temperature ranges, described herein.

Still yet other aspects of this invention are methods of making a hermetic seal comprising the steps of: (a) feeding a substrate having at least one surface coated with a composition described herein to a packaging machine; (b) forming at least one hermetic seal under suitable sealing conditions. Such suitable sealing conditions include the minimum sealing temperatures and the hot tack temperature ranges, described herein.

In one or more embodiments of this invention, the sealing conditions include the minimum sealing temperature of a hermetic seal formed from a substrate having at least one surface coated with a coating composition, described herein.

In one or more embodiments of this invention, the minimum sealing temperature is less than 70° C. at a peel strength of greater than 118 g/cm; less than 75° C. at a peel strength of greater than 197 g/cm; less than 80° C. at a peel strength of greater than 276 g/cm; less than 85° C. at a peel strength of greater than 315 g/cm, all of which are measured in accordance with the test methods described herein.

In one or more embodiments of this invention, the sealing conditions of this invention include the hot tack temperature range of a hermetic seal formed from a substrate having at least one surface coated with a coating composition, described herein.

In one or more embodiments of this invention, the hot tack temperature range is greater than 70° C. at a spring weight of 20 g/cm; is greater than 50° C. at a spring weight of 40 g/cm; is greater than 40° C. at a spring weight of 60 g/cm, all of which are measured in accordance with the test methods described herein.

BRIEF DESCRIPTION OF THE DRAWINGS

FIG. 1 shows the operating window for a thermoplastic film coated with a coating composition of this invention as well as that of a prior art coated film, when such films are processed on high-speed HFFS equipment.

DESCRIPTION OF PREFERRED EMBODIMENTS

Various specific aspects, embodiments, examples and formulations of this invention will now be described, including exemplary embodiments and definitions that are adopted herein for purposes of understanding the claimed invention. While the following detailed description gives specific preferred embodiments, those skilled in the art will appreciate that these embodiments are exemplary only, and that this invention can be practiced in other ways. For purposes of determining infringement, the scope of this invention will refer to the appended claims, including their equivalents, and elements or limitations that are equivalent to those that are recited. Any reference to the "invention" may refer to one or more, but not necessarily all, of the inventions defined by the claims.

DEFINITIONS

As used herein, the term "aqueous dispersion" is a dispersion (defined below) in which the continuous phase is comprised of liquid water.

As used herein, the phrase "coefficient of friction" or "COF" is defined as the kinetic film coefficient of friction to a specified surface.

As used herein, the term "dispersion" when used in connection with the compositions employed in this invention is defined as a mixture of at least two components, with the mixture having a continuous phase and a dispersed phase. Dispersions can be formed, for example, of: (1) an emulsion of two or more essentially liquid materials with or without one or more dispersing agents, or (2) dispersions of solid particles with or without one or more dispersing agents.

As used herein, "elastomer" is defined as a ethylene-based or propylene-based copolymer that, at room temperature, may be extended or stretched repeatedly with force to at least 100% of its original length (i.e., twice its original length), and immediately upon removal of the force, rapidly (e.g., within 5 seconds) returns to its approximate original length.

As used herein, "hot tack" is defined as the ability of a sealant material (e.g. coating material or sealant layer of a multilayer film) to self-adhere above its melting point and to generate a hermetic seal between such sealant materials where the seal strength is measured immediately following a sealing operation while the sealant materials are still in a semi-molten state as determined in accordance with the methods described herein.

As used herein, the term "hot tack temperature range" means the range of temperatures in which less than 50% of a seal is opened by a spring weight attached.

As used herein, "intermediate" is defined as the position of one layer of a multi-layer film wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "isotactic" is defined as polymeric stereoregularity having at least 40% isotactic pentads of methyl groups derived from propylene according to analysis by $^{13}$C-NMR.

As used herein, the term "microns" means micrometers (i.e., 1×10−6 meters) and may be represented as "µm."

As used herein, the term "minimum seal temperature" means the temperature reached when one temperature yields a seal value of less than a specified g/cm peel force and the next temperature yields a seal value of greater than or equal to the specified g/cm peel force.

As used herein, an "ethylene-based plastomer" is defined as an ethylene-based copolymer having a density in the range of 0.850 to 0.920 g/cm$^3$, preferably in the range 0.86 to 0.90 g/cm$^3$, and a Differential Scanning Calorimetry (DSC) melting point of greater than or equal to 40° C.

As used herein, the term "phr" means parts by weight by hundred parts of a composition on a dry, solids-only basis.

As used herein, "propylene-based plastomer" is defined to include those homopolymers, copolymers, or polymer blends having at least one of the following sets of properties:

(a) density in the range of 0.850 to 0.920 g/cm$^3$, a DSC melting point in the range of 40 to 160° C., and a melt index in the range of 2 to 100 g/10 min;

(b) a propylene-ethylene copolymer including from about 75 wt % to about 96 wt % propylene, from about 4 to 25 wt % ethylene and having a density in the range of 0.850 to 0.900 g/cm$^3$;

(c) a flexural modulus of not more than 2100 MPa and an elongation of at least 300%;

(d) isotactic stereoregularity, from about 84 to 93 wt % propylene, from about 7 to 16 wt % ethylene, a DSC melting point in the range of from about 42 to 85° C., a heat of fusion less than 75 J/g, crystallinity from about 2 to 65%, and a molecular weight distribution from about 2.0 to 3.2;

(e) a polymer blend, comprising at least one polymer (A) and at least one polymer (B), polymer (A) comprising from about 60 to 98 wt % of the blend, and polymer (A) comprising from about 82 to 93 wt % of units derived from propylene and from about 7 to 18 wt % of units derived from a comonomer selected from the group consisting of ethylene and an unsaturated monomer other than ethylene, and polymer (A) is further characterized as comprising crystallizable propylene sequences, and polymer (B) comprising an isotactic thermoplastic polymer other than polymer (A); and (f) a polymer blend, comprising at least one polymer (A) and at least one polymer (B), polymer (A) comprising from about 60 to 98 wt % of the blend, and polymer (A) comprising from about 65 to 96 wt % of units derived from propylene and from about 4 to 35 wt % of units derived from a comonomer selected from the group consisting of ethylene and an unsaturated monomer other than ethylene, and polymer (A) is further characterized as comprising crystallizable propylene sequences, and polymer (B) comprising an isotactic thermoplastic polymer other than polymer (A).

As used herein, "polymer" may be used to refer to homopolymers, copolymers, interpolymers, terpolymers, etc. Likewise, a "copolymer" may refer to a polymer comprising two or more monomers as well as to a polymer comprising three or more monomers.

As used herein, "stereoregular" is defined to mean that the predominant number, e.g., greater than 80%, of the propylene residues in the polypropylene or in the polypropylene continuous phase of a blend, such as impact copolymer exclusive of any other monomer such as ethylene, has the same 1, 2 insertion and the stereochemical orientation of the pendant methyl group is the same, either meso or racemic.

As used herein, "substantially free" is defined to mean that the referenced film layer is largely, but not necessarily wholly, absent a particular component (e.g., the ethylene-based plastomer and/or the propylene based plastomer). In one or more embodiments, small amounts of the component may be present within the referenced layer as a result of standard manufacturing methods, including recycling of film scraps and edge trim during processing.

Coating Composition

It has been discovered that when a first polymer having a mean particle size of less than or equal to 5000 nanometers and a second polymer having a mean particle size of less than or equal to 50 nanometers are dispersed in a liquid, wherein the second polymer comprises at least 5 wt % of the total combined weight of the first polymer and the second polymer, a novel and improved coating composition is produced. When the coating compositions are coated onto substrates (e.g., multilayer films), the coated substrates exhibit improved antiblocking characteristics. When the coated substrates are used to form hermetic seals and packages, the hermetic seals exhibit improved low temperature sealing properties. When the hermetic seals comprise a package for a product, the hermetic seals exhibit improved hot tack properties.

It is believed that these improved properties are due in part to the optimization of the particle sizes of the first polymer and the second polymer. The first polymer has a relatively larger particle size as compared to the relatively smaller particle size of the second polymer. When the coating composition of this invention, comprised of the larger particle-sized first polymer and the smaller particle-sized second polymer, are applied or coated onto a substrate, the particles compact optimally in which the smaller particle fits within the interstices formed by the larger particles. This produces a higher density coating with improved coating laydown and adhesion to provide the exhibited lower temperature sealing properties combined with improved hot tack properties.

In some embodiments, the particle size distribution of the coating composition, defined as volume average particle diameter (Dv) divided by number average particle diameter (Dn), is greater than or equal to about 2.0; preferably, greater than or equal to 5; more preferably, greater than or equal to 10.

Aspects of this invention relate to coating compositions which comprise:

(a) a first liquid, (b) a first polymer dispersed in the first liquid, said first polymer having a mean particle size less than or equal to 5000 nanometers;

(c) a second polymer dispersed in the first liquid, said second polymer having a mean particle size less than or equal to 50 nanometers, said second polymer comprising at least 5 wt % of the combined total weight of the first polymer and the second polymer.

The liquid is any liquid suitable for dispersing the first copolymer and/or the second copolymer. Preferably, the liquid is water. Preferably, the first polymer dispersed in the first liquid is a first polymer dispersion.

The first polymer is any suitable polymer having a mean size less than or equal to 5000 nanometers. The mean particle size of the first polymer may be less than or equal to 4000 nanometers, or less than or equal to 3000 nanometers, or less than or equal to 2000 nanometers, or less than or equal to 1500 nanometers. Preferably, the mean particle size of the first polymer is less than or equal to 1200 nanometers. Preferably, the first polymer is a first copolymer. Preferably, the second polymer dispersed in the first liquid is a second polymer dispersion.

The second polymer is any suitable polymer having a mean size less than or equal to 50 nanometers. The mean particle size of the second polymer is less than 45 nanometers, or less than 40 nanometers, or less than 35 nanometers, or less than 30 nanometers. Preferably, the second polymer is a second copolymer.

In one embodiment, the liquid comprises water and the first polymer and the second polymer are dispersed with at least one dispersing agent to form at least one aqueous dispersion.

In another embodiment, the first polymer of the coating composition is dispersed in a first aqueous dispersion and the second copolymer is dispersed in a second aqueous dispersion.

In another embodiment, the mean particle size of the first aqueous dispersion of the coating compositions is less than or equal to 1000 nanometers, or less than or equal to 800 nanometers, or less than or equal to 600 nanometers, or less than or equal to 400 nanometers.

Preferably, the first copolymer comprises ethylene and an alpha-olefin having less than 20 carbon atoms. More preferably, the first copolymer comprises ethylene and the alpha-olefin is 1-octene.

Preferably, the melt index of the first copolymer is less than or equal to 35 g/10 min, or less than or equal to 25 g/10 min, or less than or equal to 15 g/10 min, or less than or equal to 10 g/10 min measured in accordance with the test methods described herein.

The first copolymer of the first aqueous dispersion of the coating compositions is a blend, comprising a first ethylene copolymer and a second ethylene copolymer. In this embodiment, the first ethylene copolymer has a first mean particle size and comprises ethylene and a first alpha-olefin. The second ethylene copolymer has a second mean particle size and comprises ethylene and a second alpha-olefin. The first alpha-olefin and the second alpha-olefin have less than 20 carbon atoms. In some embodiments, the first alpha-olefin and the second alpha-olefin are the same. Preferably, the first alpha-olefin and the second alpha-olefin are 1-octene. In this embodiment, the mean particle size of the first ethylene copolymer is less than 1100 nanometers and the mean particle size of the second ethylene copolymer is less than 700 nanometers. The melt index of the first ethylene copolymer and the second copolymer is less than 10 g/10 min measured in accordance with the test methods described herein.

In another embodiment, the first aqueous dispersion may be a mixture of the first ethylene copolymer and the second ethylene copolymer. The mean particle size of the mixture is in the range from 400 to 1200 nanometers, or from 400 to 1000 nanometers, or from 400 to 800 nanometers, or from 400 to 700 nanometers, or from 400 to 600 nanometers.

In another embodiment, the first ethylene copolymer comprises ethylene and 1-octene, has a mean particle size of less than 1100 nanometers and a melt index of less than 10 g/10 min measured in accordance with the test methods described herein. The second ethylene copolymer comprises ethylene and 1-octene, has a mean particle size of less than 850 nanometers and a melt index of less than 35 g/10 min measured in accordance with the test methods described herein.

In some embodiments, the first alpha-olefin and the second alpha-olefin are different.

In some embodiments, the dispersing agent of the coating composition comprises a copolymer selected from the group consisting of an ethylene-acrylic acid copolymer, an ionized salt of the ethylene-acrylic acid copolymer, an ethylene-methacrylic acid copolymer, an ionized salt of the ethylene-methacrylic acid copolymer, a fatty acid, a ionized salt of a fatty acid, and mixtures thereof.

In a preferred embodiment, the dispersing agent is ethylene-acrylic acid copolymer ionized with potassium hydroxide or montanic acid ionized with potassium hydroxide.

In another embodiment, the second copolymer is selected from the group consisting of an ethylene-acrylic acid copolymer, an ionized salt of the ethylene-acrylic acid copolymer, an ethylene-methacrylic acid copolymer, an ionized salt of the ethylene-methacrylic acid copolymer, and mixtures thereof.

The mean particle size of the second aqueous dispersion is less than 50 nanometers, or less than 40 nanometers, or less than 30 nanometers, or less than 20 nanometers.

In one or more embodiments, the second polymer comprises at least 10 wt % of the total combined weight of the first polymer and the second polymer, or at least 15 wt % of the total combined weight of the first polymer and the second polymer.

In one or more embodiments, the second copolymer comprises at least 10 wt % of the total combined weight of the first copolymer and the second copolymer, or at least 15 wt % of the total combined weight of the first copolymer and the second copolymer.

In one or more embodiments, the coating compositions further comprise a slip agent. The slip agent has a mean particle size of less than 130 nanometers, or less than 100 nanometers, or less than 70 nanometers, or less than 50 nanometers. The slip agent may comprise a polyethylene wax, a paraffin wax, a microcrystalline wax, a beeswax, a carnauba wax, a montan wax, a candelilla wax, a synthetic wax, or mixtures thereof.

In one or more embodiments, the coating compositions may further comprise one or more anti-block agents. The anti-block agents may be selected from the group consisting of a polymethylmethacrylate particles, silicone particles, colloidal silica, fumed silica particles, silicone gum, talc, finely-divided clay and mixtures thereof. The mean particle size of the anti-block agent is from 0.5 to 10 microns.

In one or more embodiments, the coating compositions may further comprise one or more coalescent and wetting agents. The coalescent and wetting agents may be selected from the group consisting of selected from the group consisting of a hexyl or benzyl ether of ethylene glycol, a hexyl ether of diethylene glycol, a butyl alcohol, a hexyl alcohol, an octyl alcohol, diacetone alcohol, a non-ionic surfactant, an anionic surfactant and mixtures thereof.

In one or more embodiments, the coating compositions may further comprise one or more primers. The primer may be selected from the group consisting of polyethylene imine (PEI) resin, a crosslinked epoxy resin, and a polyurethane resin.

Coated Substrates

Other aspects of this invention are substrates that are coated with the coating compositions of this invention, described herein, to form coated substrates. The substrates may be selected from the group consisting of a polyolefin film, a polypropylene film, a polyethylene terephthalate film, a cellophane film, a polyethylene film, paper, aluminum foil, a single-layer thermoplastic film, and a polyamide film.

The substrates may also be any surface of a layer of the multi-layer thermoplastic films described herein.

In one embodiment, the coating compositions are applied to at least one outermost surface of the multi-layer thermoplastic film. In other embodiments, the coating compositions are applied to both outermost skin layers of the multi-layer thermoplastic film.

The coating composition is applied to the substrate at a coating weight of 0.5 to 5.0 g/m$^2$, or 1.0 to 3.0 g/m$^2$, or 2.0 to 2.5 g/m$^2$ of substrate.

Multi-Layer Films as Coated Substrates

The multi-layer film substrates that may be coated with the coating compositions of this invention may be comprised of a core layer, one or more tie layers (i.e., a first tie layer and/or a second tie layer), one or more skin layers (i.e., a first skin layer and/or a second skin layer), and may include one or more additives. Such multi-layer film substrates may be oriented in one or more directions, and may be subjected to one or more surface treatments and/or metallization treatments. One of the surfaces of such multi-layer film substrates may receive a top coating. The surface of the multilayer film substrates that will not be coated with the coating compositions of this invention may receive another top coating. These multi-layer film substrates may be used as mono-webs or used in laminations.

Core Layer of Multi-Layer Films

As is known to those skilled in the art, the core layer of a multi-layered film is most commonly the thickest layer and provides the foundation of the multi-layer structure. The core layer of the multi-layer film that may be used as a substrate for the present invention comprises any film-forming polyolefin known in the art.

In some embodiments of this invention, the core layer comprises at least one polymer selected from the group consisting of butylene polymer, ethylene polymer, high density polyethylene (HDPE) polymer, medium density polyethylene (MDPE) polymer, low density polyethylene (LDPE) polymer, propylene (PP) polymer, isotactic polypropylene (iPP) polymer, high crystallinity polypropylene (HCPP) polymer, ethylene-propylene (EP) copolymers, ethylene-propylene-butylene (EPB) terpolymers, propylene-butylene (PB) copolymer, an ethylene elastomer, a ethylene-based plastomer, a propylene elastomer and combinations or blends thereof.

In some embodiments, the core layer comprises the propylene-based plastomer, as defined herein, and, optionally, one or more other polymers. Preferably, the propylene-based plastomer comprises ethylene-propylene (EP) random copolymers, ethylene-propylene-butylene (EPB) random terpolymers, heterophasic random copolymers, butylene polymers, metallocene polypropylenes, propylene-based or ethylene-based elastomers and/or ethylene-based plastomers, or combinations thereof. In preferred embodiments, the propylene-based plastomer has a density in the range of 0.850 to 0.920 g/cm³, a DSC melting point in the range of 40 to 160° C., and a melt index in the range of 2 to 100 g/10 min. More preferably, the propylene-based plastomer is a grade of VISTAMAXX™ polymer (commercially available from Exxon-Mobil Chemical Company of Baytown, Tex.). Preferred grades of VISTAMAXX™ are VM6100 and VM3000. Alternatively, the propylene-based plastomer may be a suitable grade of VERSIFY™ performance polymers (commercially available from The Dow Chemical Company of Midland, Mich.), Basell CATALLOY™ resins such as ADFLEX™ T100F, SOFTELL™ Q020F, CLYRELL™ SM1340 (commercially available from Basell Polyolefins of The Netherlands), PB (propylene-butene-1) random copolymers such as Basell PB 8340 (commercially available from Basell Polyolefins of The Netherlands), Borealis BORSOFT™ SD233CF, (commercially available from Borealis of Denmark), EXCEED™ 1012CA and 1018CA metallocene polyethylenes, EXACT™ 5361, 4049, 5371, 8201, 4150, 3132 ethylene-based plastomers, EMCC 3022.32 low density polyethylene (LDPE) (commercially available from Exxon-Mobil Chemical Company of Baytown, Tex.), Total Polypropylene 3371 polypropylene homopolymer (commercially available from Total Petrochemicals of Houston, Tex.) and JPP 7500 C2C3C4 terpolymer (commercially available from Japan Polypropylene Corporation of Japan).

In the most preferred embodiments, the propylene-based plastomer is a propylene-ethylene copolymer and the first tie layer comprises at least 10 wt % of the propylene-based plastomer in the first tie layer, preferably at least 25 wt % of the propylene-based plastomer in the first tie layer, more preferably at least 50 wt % of the propylene-based plastomer in the first tie layer, and most preferably at least 90 wt % of the propylene-based plastomer in the first tie layer. In some preferred embodiments, the first tie layer comprises about 100 wt % of the propylene-based plastomer.

In some embodiments, the propylene-based plastomer has a propylene content ranging from 75 to 96 wt %, preferably ranging from 80 to 95 wt %, more preferably ranging from 84 to 94 wt %, most preferably ranging from 85 to 92 wt %, and an ethylene content ranging from 4 to 25 wt %, preferably ranging from 5 to 20 wt %, more preferably ranging from 6 to 16 wt %, most preferably ranging from 8 to 15 wt %.

The propylene-based plastomer preferably has a density ranging from 0.850 to 0.920 g/cm³, more preferably ranging from 0.850 to 0.900 g/cm³, most preferably from 0.870 to 0.885 g/cm³.

The DSC melting point of the propylene-based plastomer preferably ranges from 40° C. to 160° C., more preferably from 60° C. to 120° C. Most preferably, the DSC melting point is below 100° C.

In some embodiments, the propylene-based plastomer has a melt index ranging from 2 to 100 g/10 min, preferably ranging from 5 to 50 g/10 min, more preferably ranging from 5 to 25 g/10 min, most preferably from 5 to 10 g/10 min.

The propylene-based plastomer may further have a molecular weight distribution (MWD) below 7.0, preferably ranging from 1.8 to 5.0, more preferably ranging from 2.0 to 3.2, most preferably, less than or equal to 3.2.

The propylene-based plastomer has a flexural modulus of preferably not more than 2100 MPa, more preferably not more than 1500 MPa, most preferably ranging from 20 MPa to 700 MPa.

The elongation of the propylene-based plastomer is preferably at least 300%, more preferably at least 400%, even more preferably at least 500%, and most preferably greater than 1000%. In some cases, elongations of 2000% or more are possible.

The heat of fusion of the propylene-based plastomer is preferably less than 75 J/g.

In some embodiments, the propylene-based plastomer has isotactic stereoregular crystallinity. In other embodiments, the propylene-based plastomer has a crystallinity ranging from 2 to 65%.

The propylene-based plastomer may be produced via a single site catalyst polymerization process. In some embodiments, the single site catalyst incorporates hafnium.

The core layer may also comprise one or more additional polymers. When one or more additional polymers are present, the propylene-based plastomer is preferably present in an amount of from at least about 25 to about 75 wt % of the core layer. Amounts of the propylene-based plastomer of less than 25 wt % (e.g., 10 wt %) or greater than 75 wt % (e.g., 90 wt % or more) are also permissible, depending upon the desired properties for the multi-layer film product. The optional additional polymers may comprise one or more $C_2$-$C_8$ homopolymers, copolymers, or terpolymers.

In a preferred embodiment, the core layer is an iPP homopolymer. An example of a suitable iPP is ExxonMobil PP4712E1 (commercially available from ExxonMobil Chemical Company of Baytown, Tex.). Another suitable iPP is Total Polypropylene 3371 (commercially available from Total Petrochemicals of Houston, Tex.). An example of HCPP is Total Polypropylene 3270 (commercially available from Total Petrochemicals of Houston, Tex.).

The core layer may further include a hydrocarbon resin. Hydrocarbon resins may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight less than 5000, preferably less than 2000, most preferably in the range of from 500 to 1000. The resin can be natural or synthetic and may have a softening point in the range of from 60 to 180° C.

Suitable hydrocarbon resins include, but are not limited to petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

Hydrocarbon resins that may be suitable for use as described herein include EMPR 120, 104, 111, 106, 112, 115, EMFR 100 and 100A, ECR-373 and ESCOREZ™ 2101, 2203, 2520, 5380, 5600, 5618, 5690 (commercially available from ExxonMobil Chemical Company of Baytown, Tex.); ARKON™ M90, M100, M115 and M135 and SUPER ESTER™ rosin esters (commercially available from Arakawa Chemical Company of Japan); SYLVARES™ phenol modified styrene, methyl styrene resins, styrenated terpene resins, ZONATAC™ terpene-aromatic resins, and terpene phenolic resins (commercially available from Arizona Chemical Company of Jacksonville, Fla.); SYLVATAC™ and SYLVALITE™ rosin esters (commercially available from Arizona Chemical Company of Jacksonville, Fla.); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ $C_5/C_9$ resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa.); FORAL™, PENTALYN™, and PERMALYN™ rosins and rosin esters (commercially available from Hercules, now Eastman Chemical Company of Kingsport, Tenn.); QUINTONE™ acid modified $C_5$ resins, $C_5/C_9$ resins, and acid modified $C_5/C_9$ resins (commercially available from Nippon Zeon of Japan); and LX™ mixed aromatic/cycloaliphatic resins (commercially available from Neville Chemical Company of Pittsburgh, Pa.); CLEARON™ hydrogenated terpene aromatic resins (commercially available from Yasuhara of Japan); and PICCOLYTE™ (commercially available from Loos & Dilworth, Inc. of Bristol, Pa.). Other suitable hydrocarbon resins may be found in U.S. Pat. No. 5,667,902, incorporated herein by reference. The preceding examples are illustrative only and by no means limiting.

Preferred hydrocarbon resins for use in the films of this invention include saturated alicyclic resins. Such resins, if used, may have a softening point in the range of from 85 to 140° C., or preferably in the range of 100 to 140° C., as measured by the ring and ball technique. Examples of suitable, commercially available saturated alicyclic resins are ARKON-P® (commercially available from Arakawa Forest Chemical Industries, Ltd., of Japan).

The amount of such hydrocarbon resins, either alone or in combination, in the core layer is preferably less than 20 wt %, more preferably in the range of from 1 to 5 wt %, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 to 10 wt %, based on the total weight of the core layer. Alternatively, the core layer may be cavitated by beta nucleation.

Preferably, the total amount of additives in the core layer comprises up to about 20 wt % of the core layer, but some embodiments may comprise additives in the core layer in an amount up to about 30 wt % of the core layer.

The core layer preferably has a thickness in the range of from about 5 to 100 microns, more preferably from about 5 to 50 microns, most preferably from 5 to 25 microns.

First Tie Layer of Multi-Layer Films

As is known to those skilled in the art, the tie layer of a multi-layer film is typically used to connect two other, partially or fully incompatible, layers of the multi-layer film structure, e.g., a core layer and a skin layer, and is positioned intermediate these other layers.

In some embodiments of this invention, the first tie layer is in direct contact with the surface of the core layer. In other embodiments, another layer or layers may be intermediate the core layer and the first tie layer.

In some embodiments of this invention, the film described herein may be a 4-layer metallized multi-layer film, including a core layer, a first skin layer, and a metallized layer, all as described herein, and a tie layer located either (a) intermediate the core layer and the first skin layer or (b) intermediate the core layer and the metallized layer. In other embodiments, the multi-layer film described herein may be a 5-layer metallized multi-layer film, including a core layer, a first skin layer, a metallized layer, a first tie layer located intermediate the core layer and the seal layer and a second tie layer located intermediate the core layer and the metallized layer. The tie layers of the present invention preferably comprise at least one polymer selected from the group consisting of butylene polymer, ethylene polymer, high density polyethylene (HDPE) polymer, medium density polyethylene (MDPE) polymer, low density polyethylene (LDPE) polymer, propylene (PP) polymer, isotactic polypropylene (iPP) polymer, high crystallinity polypropylene (HCPP) polymer, ethylene-propylene (EP) copolymers, ethylene-propylene-butylene (EPB) terpolymers, propylene-butylene (PB) copolymer, an ethylene elastomer, a ethylene-based plastomer, a propylene elastomer and combinations or blends thereof.

In some embodiments, the first tie layer comprises the propylene-based plastomer, as defined herein, and, optionally, one or more other polymers. Preferably, the propylene-based plastomer comprises ethylene-propylene (EP) random copolymers, ethylene-propylene-butylene (EPB) random terpolymers, heterophasic random copolymers, butylene polymers, metallocene polypropylenes, propylene-based or ethylene-based elastomers and/or ethylene-based plastomers, or combinations thereof.

The first tie layer may also comprise one or more additional polymers. When one or more additional polymers are present, the propylene-based plastomer is preferably present in an amount of from at least about 25 to about 75 wt % of the first tie layer. Amounts of the propylene-based plastomer of less than 25 wt % (e.g., 10 wt %) or greater than 75 wt % (e.g., 90 wt % or more) are also permissible, depending upon the desired properties for the multi-layer film product. The optional additional polymers may comprise one or more $C_2$-$C_8$ homopolymers, copolymers, or terpolymers. Preferably, the additional polymer is comprised of at least one of an iPP homopolymer, an EP copolymer, and combinations thereof. An example of a suitable iPP homopolymer is Total Polypropylene 3371 (commercially available from Total Petrochemicals of Houston, Tex.).

In some embodiments, the first tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the first tie layer is typically in the range of from about 0.50 to 25 microns, preferably from about 0.50 to 12 microns, more preferably from about 0.50 to 6 microns, and most preferably from about 2.5 to 5 microns. However, in some thinner films, the first tie layer thickness may be from about 0.5 to 4 microns, or from about 0.5 to 2 microns, or from about 0.5 to 1.5 microns.

First Skin Layer of Multi-Layer Films

In some embodiments of this invention, the first skin layer is contiguous to the first tie layer. In other embodiments, one or more other layers may be intermediate the first tie layer and the first skin layer.

In some embodiments, the first skin layer includes a polymer that is suitable for heat-sealing or bonding to itself when crimped between heated crimp-sealer jaws. Commonly, suitable skin layer polymers include copolymers or terpolymers of ethylene, propylene, and butylene and may have DSC melting points either lower than or greater than the DSC melting point of the propylene-based plastomer. In some preferred embodiments, the first skin layer comprises at least one polymer selected from the group consisting of propylene homopolymer, ethylene-propylene copolymer, butylene homopolymer and copolymer, ethylene-propylene-butylene (EPB) terpolymer, ethylene vinyl acetate (EVA), metallocene-catalyzed propylene homopolymer, and combinations thereof. An example of a suitable EPB terpolymer is Chisso XPM-7794 (commercially available from Japan Polypropylene Corporation, formerly known as Chisso Corporation of Japan).

Heat sealable blends can be utilized in providing the first skin layer. Thus, along with the skin layer polymer identified above there can be, for example, other polymers, such as polypropylene homopolymer, e.g., one that is the same as, or different from, the iPP of the core layer. The first skin layer may have a matte appearance and additionally or alternatively include materials selected from the group consisting of ethylene-propylene random copolymers, low density polyethylene (LDPE), linear low density polyethylene (LLDPE), medium density polyethylene (MDPE), high density polyethylene (HDPE), and combinations thereof.

In a preferred embodiment, the first skin layer is a substrate for any of the coating compositions of this invention.

The first skin layer may also comprise processing aid additives, such as anti-block agents, anti-static agents, slip agents and combinations thereof, as discussed in further detail below.

The thickness of the first skin layer is typically in the range of from about 0.010 to 7.0 microns, preferably about 0.10 to 4 microns, and most preferably about 0.10 to 3 microns. In some embodiments, the first skin layer thickness may be from about 0.10 to 2 microns, 0.10 to 1 microns, or 0.10 to 0.50 microns. In some commonly preferred film embodiments, the first skin layer has a thickness in the range of from about 0.5 to 2 microns, 0.5 to 3 microns, or 1 to 3.5 microns.

Second Skin Layer of Multi-Layer Films

A second skin layer is optional and when present is provided on the opposite side of the core layer from the first skin layer. The second skin layer may be contiguous to the core layer or contiguous to one or more other layers positioned intermediate the core layer and the second skin layer. The second skin layer may be provided to improve the film's barrier properties, processability, printability, and/or compatibility for metallization, coating, and lamination to other films or substrates.

In some embodiments, the second skin layer comprises at least one polymer selected from the group consisting of a PE polymer or copolymer, a PP polymer or copolymer, an ethylene-propylene copolymer, an EPB terpolymer, a PB copolymer, an ethylene-vinyl alcohol (EVOH) polymer, and combinations thereof. Preferably, the PE polymer is high-density polyethylene (HDPE), such as HD-6704.67 (commercially available from ExxonMobil Chemical Company of Baytown, Tex.), M-6211 and HDPE M-6030 (commercially available from Equistar Chemical Company of Houston, Tex.). A suitable ethylene-propylene copolymer is Fina 8573 (commercially available from Fina Oil Company of Dallas, Tex.). Preferred EPB terpolymers include Chisso 7510 and 7794 (commercially available from Chisso Corporation of Japan). For coating and printing functions, the second skin layer may preferably comprise a copolymer that has been surface treated. For metallizing or barrier properties, a HDPE, a PB copolymer, PP or EVOH may be preferred. A suitable EVOH copolymer is EVAL™ G176B (commercially available from Kuraray Company Ltd. of Japan).

The second skin layer may also comprise processing aid additives, such as anti-block agents, anti-static agents, slip agents and combinations thereof, as discussed in further detail below.

The thickness of the second skin layer depends upon the intended function of the second skin layer, but is typically in the range of from about 0.50 to 3.5 microns, preferably from about 0.50 to 2 microns, and in many embodiments most preferably from about 0.50 to 1.5 microns. Also, in thinner film embodiments, the second skin layer thickness may range from about 0.50 to 1.0 microns, or 0.50 to 0.75 microns.

Second Tie Layer of Multi-Layer Films

A second tie layer is optional and when present is located intermediate the core layer and the second skin layer. In one embodiment, the second tie layer comprises a blend of propylene homopolymer and, optionally, at least one propylene-based plastomer, as described above. The propylene homopolymer is preferably an iPP. The propylene-based plastomer preferably comprises at least 10 wt % of the second tie layer, more preferably at least 90 wt % of the second tie layer. In some preferred embodiments, the second tie layer is an adhesion promoting material such as ADMER™ AT1179A (commercially available from Mitsui Chemicals America Inc. of Purchase, N.Y.), a maleic anhydride modified polypropylene.

The second tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the second tie layer is in the range of from about 0.5 to 25 microns, preferably from about 1 to 12 microns, and most preferably from about 1 to 10 microns. Also, the thickness may be from about 0.5 to 8 microns, or 1 to 6 microns, or 1 to 4 microns.

Additives for Multi-Layer Films

Additives that may be present in one or more layers of the multi-layer films of this invention, include, but are not limited to opacifying agents, pigments, colorants, cavitating agents, slip agents, antioxidants, anti-fog agents, anti-static agents, anti-block agents, fillers, moisture barrier additives, gas barrier additives and combinations thereof. Such additives may be used in effective amounts, which vary depending upon the property required.

Examples of suitable opacifying agents, pigments or colorants are iron oxide, carbon black, aluminum, titanium dioxide ($TiO_2$), calcium carbonate ($CaCO_3$), talc, and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are polybutylene terephthalate (PBT), nylon, solid or hollow pre-formed glass spheres, metal beads or spheres, ceramic spheres, calcium carbonate, talc, chalk, cyclic olefinic copolymers (COC), or combinations thereof. Cavitation may also be introduced by beta-cavitation, which includes creating beta-form crystals of polypropylene and converting at least some of the beta-crystals to alpha-form polypropylene crystals and creating a small void remaining after the conversion. Preferred beta-cavitated embodiments of the core layer may also comprise a beta-crystalline nucleating agent. Substantially any beta-crystalline nucleating agent ("beta nucleating agent" or "beta nucleator") may be used. The average diameter of the void-initiating particles typically may be from about 0.1 to 10 microns.

Slip agents may include higher aliphatic acid amides, higher aliphatic acid esters, waxes, silicone oils, and metal soaps. Such slip agents may be used in amounts ranging from 0.1 to 2 wt % based on the total weight of the layer to which it is added. An example of a slip additive that may be useful for this invention is erucamide.

Non-migratory slip agents, used in one or more skin layers of the multi-layer films of this invention, may include polymethyl methacrylate (PMMA). The non-migratory slip agent may have a mean particle size in the range of from about 0.5 to 8 microns, or 1 to 5 microns, or 2 to 4 microns, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX™ 1010 (commercially available from Ciba-Geigy Company of Switzerland). Such an anti-oxidant is generally used in amounts ranging from 0.1 to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 to 3 wt %, based upon the total weight of the layer(s).

Examples of suitable anti-blocking agents may include silica-based products such as SYLOBLOC™ 44 (commercially available from Grace Davison Products of Colombia, Md.), PMMA particles such as EPOSTAR™ (commercially available from Nippon Shokubai Co., Ltd. of Japan), or polysiloxanes such as TOSPEARL (commercially available from GE Bayer Silicones of Wilton, Conn.). Such an anti-blocking agent comprises an effective amount up to about 3000 ppm of the weight of the layer(s) to which it is added.

Fillers useful in this invention may include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives may include effective amounts of low-molecular weight resins, hydrocarbon resins, particularly petroleum resins, styrene resins, cyclopentadiene resins, and terpene resins.

Optionally, one or more skin layers may be compounded with a wax or coated with a wax-containing coating, for lubricity, in amounts ranging from 2 to 15 wt % based on the total weight of the skin layer. Any conventional wax, such as, but not limited to Carnauba™ wax (commercially available from Michelman Corporation of Cincinnati, Ohio) that is useful in thermoplastic films is contemplated.

Film Orientation for Multi-Layer Films

The embodiments of this invention include possible uniaxial or biaxial orientation of the multi-layer films. Orientation in the direction of extrusion is known as machine direction (MD) orientation. Orientation perpendicular to the direction of extrusion is known as transverse direction (TD) orientation. Orientation may be accomplished by stretching or pulling a film first in the MD followed by TD orientation. Blown films or cast films may also be oriented by a tenterframe orientation subsequent to the film extrusion process, again in one or both directions. Orientation may be sequential or simultaneous, depending upon the desired film features. Preferred orientation ratios are commonly from between about three to about six times in the machine direction and between about four to about ten times the extruded width in the transverse direction. Typical commercial orientation processes are BOPP tenter process, blown film, and LISIM technology.

Application of Coatings

The coating compositions of the present invention may be applied to a substrate using techniques well known to those skilled in the art. Such prior art coating application techniques include, but are not limited to, gravure coating, brush coating, dipping, curtain flow coating, roll coating, or spraying. In the case of single layer substrates, such as a thermoplastic film, the coating compositions may be applied to at least one surface of the single layer substrate. In the case of multi-layer coextruded film, it can be applied to a coextruded layer of the multilayer film. Preferably, the coating compositions may be applied to single layer and multilayer films after they are formed, preferably, after the films have been oriented by stretching in at least one direction. A gravure coating process is the preferred method of applying coatings because it can apply a thin even coating on films.

Another method for application of the coating compositions of this invention includes a dispersion coating process. In this process, the base film is unwound from a mandrel and the coating applied at the desired thickness. After the coating has dried, the coated film structure is wound up again into a uniform roll.

Surface Treatment for Substrates

One or both of the outer surfaces of the substrates (e.g., multi-layer films) may be surface-treated to increase the surface energy to render the film receptive to metallization, coatings, printing inks, and/or lamination. The surface treatment can be carried out according to one of the methods known in the art including corona discharge, flame, plasma, chemical treatment, or treatment by means of a polarized flame.

Metallization for Substrates

One or both of the outer surfaces of the substrates (e.g., multi-layer films) may be metallized. Such surfaces may be metallized using conventional methods, such as vacuum metallization by deposition of a metal layer such as aluminum, copper, silver, chromium, or mixtures thereof.

Top Coatings for Substrates

In some embodiments, one or more top coatings, such as for barrier, printing and/or processing, may be applied to an outermost surface of a substrate (e.g., multi-layer films) that is opposite to a surface coated with a coating composition described herein. Also, top coatings may be applied to a surface that has been coated with a coating composition described herein. Such top coatings may include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings are preferably applied by an emulsion coating technique, but may also be applied by co-extrusion and/or lamination.

The PVdC coatings that are suitable for use with the multi-layer films of this invention are any of the known PVdC compositions heretofore employed as coatings in film manufacturing operations, e.g., any of the PVdC materials described in U.S. Pat. Nos. 4,214,039, 4,447,494, 4,961,992, 5,019,447, and 5,057,177, incorporated herein by reference.

Known vinyl alcohol-based coatings, such as PVOH and EVOH, that are suitable for use with the multi-layer films of invention include VINOL™ 125 or VINOL™ 325 (both commercially available from Air Products, Inc. of Allentown, Pa.). Other PVOH coatings are described in U.S. Pat. No. 5,230,963, incorporated herein by reference.

Before applying a coating composition of this invention or top coatings, to a substrate the outer surface of the film may be treated as noted herein to increase its surface energy. This treatment can be accomplished by employing one or more known techniques, such as flame treatment, plasma, corona discharge, film chlorination (e.g., exposure of the film surface to gaseous chlorine), treatment with oxidizing agents such as chromic acid, hot air or steam treatment, flame treatment and the like. Although any of these techniques is effectively employed to pre-treat the film surface, a frequently preferred method is corona discharge, an electronic treatment method that includes exposing the film surface to a high voltage corona discharge while passing the film between a pair of spaced electrodes. After treatment of the film surface, the coating composition is then applied thereto.

In one embodiment, a primer coating may be applied as a top coating to one or more surfaces of a substrate (e.g., multi-layer film). The primer may be applied to a surface of a substrate before application of a coating composition described herein to such surface. Also, a primer may be applied before application of another top coating to one or both surfaces of a substrate. When a primer is to be applied, the substrate may be first surface treated by one or more of the foregoing methods.

In another embodiment, the primer coating may be added to any of the coating compositions of this invention.

Such primer materials are well known in the art and include, for example, epoxy and poly(ethylene imine) (PEI) materials. U.S. Pat. Nos. 3,753,769, 4,058,645 and 4,439,493, each incorporated herein by reference, disclose the use and application of such primers. The primer provides an overall adhesively active surface for thorough and secure bonding with the subsequently applied coating composition and can be applied to a substrate by conventional solution coating means, for example, by roller application.

The coating composition can be applied to a substrate as a solution, one prepared with an organic solvent such as an alcohol, ketone, ester, and the like. However, since the coating composition can contain insoluble, finely divided inorganic materials that may be difficult to keep well dispersed in organic solvents, it is preferable that the coating composition be applied to the treated surface in any convenient manner, such as by gravure coating, roll coating, dipping, spraying, and the like. The excess aqueous solution can be removed by squeeze rolls, doctor knives/blades, and the like.

The film can be stretched in the MD, coated with the coating composition and then stretched perpendicular in the TD. In yet another embodiment, the coating can be carried out after biaxial orientation is completed.

The coating composition may be applied in such an amount that there will be deposited upon drying a smooth, evenly distributed layer. The coating may be dried by hot air, radiant heat, or by any other convenient means. Coatings useful in this invention may have coating weights ranging from 0.5 to 1.6 g/m$^2$ for conventional PVOH coatings, 0.78 to 2.33 g/m$^2$ for conventional acrylic and low temperature seal coatings, and 1.6 to 6.2 g/m$^2$ for conventional PVdC coatings.

Laminations for Substrates

Substrates, such as multi-layer films, are useful as substantially stand-alone film webs or they may be adhered, or laminated to other film structures. In the case of multi-layer films, they may be prepared by any suitable methods comprising the steps of co-extruding a multi-layer film according to this specification, oriented and prepared for intended uses such as by coating, printing, slitting, or other converting methods. Preferred methods comprise co-extruding, then casting and orienting the multi-layer film, as discussed in this specification.

For some applications, it may be desirable to laminate the multi-layer films of this invention to other polymeric film or paper products for purposes such as package decor including printing and metallizing. These activities are typically performed by the ultimate end-users or film converters who process films for supply to the ultimate end-users.

Hermetic Seals Formed from Coated Substrates

Other aspects of this invention are hermetic seals which are formed from the coated substrates described herein. In one embodiment, a substrate having at least one surface coated with a coating composition described herein to form a coated substrate, wherein a first portion of the coated surface is sealed under suitable sealing conditions to a second portion of the coated surface to form a hermetic seal (e.g., a fin seal).

In another embodiment, the hermetic seals of this invention comprise a substrate having a first surface and a second surface opposite the first surface. At least a portion of the first surface is coated with a coating composition described herein to form a first coated substrate. At least a portion of the second surface is coated with a coating composition described herein to form a second coated substrate. A portion of the first coated substrate is sealed under suitable sealing conditions to a portion of the second coated substrate to form a hermetic seal (e.g., a lap seal).

Such suitable sealing conditions include the minimum sealing temperatures and the hot tack temperature ranges, described herein.

Packages Having Hermetic Seals Formed from Coated Substrates

Other aspects of this invention are packages having one or more of the hermetic seals of this invention. In one embodiment, a substrate having at least one surface coated with a coating composition described herein to form a coated substrate. The coated substrate is formed into a package adapted to contain a product. At least one hermetic seal comprised of a first portion of the coated surface is sealed under suitable sealing conditions to a second portion of the coated surface to form the package having the hermetic seal (e.g. a fin seal). Such suitable sealing conditions include the minimum sealing temperatures and the hot tack temperature ranges, described herein.

In another embodiment, the hermetic seals of this invention comprise a substrate having a first surface and a second surface opposite the first surface. At least a portion of the first surface is coated with a coating composition described herein to form a first coated substrate. At least a portion of the second surface is coated with a coating composition described herein to form a second coated substrate. The first and second coated substrates are formed into a package adapted to contain a product. A portion of the first coated substrate is sealed under suitable sealing conditions to a portion of the second coated substrate to form the package having a hermetic seal (e.g., a lap seal).

Method of Making Hermetic Seals

Still other aspects of this invention are methods of making the hermetic seals of this invention. In one embodiment, the method comprises the steps of: (a) feeding a substrate having at least one surface coated with a composition, described herein, to a packaging machine; (b) forming at least one hermetic seal under suitable sealing conditions. Such suitable sealing conditions include the minimum sealing temperatures and the hot tack temperature ranges, described herein.

INDUSTRIAL APPLICABILITY

Minimum Seal Temperatures

The sealing conditions of this invention include the minimum sealing temperature of a hermetic seal formed from a substrate having at least one surface coated with a coating composition, described herein. The minimum sealing temperature is less than 70° C., or less than 65° C., or less than 60° C. at a peel strength of greater than 118 g/cm measured in accordance with the test methods described herein.

The minimum sealing temperature is less than 75° C., or less than 70° C., or less than 65° C. at a peel strength of greater than 197 g/cm measured in accordance with the test methods described herein.

The minimum sealing temperature is less than 80° C., or less than 75° C., or less than 70° C. at a peel strength of greater than 276 g/cm measured in accordance with the test methods described herein.

The minimum sealing temperature is less than 85° C. at a peel strength of greater than 315 g/cm measured in accordance with the test methods described herein.

Hot Tack Properties

The sealing conditions of this invention includes the hot tack temperature range of a hermetic seal formed from a substrate having at least one surface coated with a coating composition, described herein. The hot tack temperature range is greater than 90° C., or greater than 85° C., or greater than 80° C., or greater than 75° C., or greater than 70° C. at a spring weight of 20 g/cm measured in accordance with the test methods described herein.

The hot tack temperature range is greater than 80° C., or greater than 75° C., or greater than 70° C., or greater 65° C., or greater than 60° C., or greater 55° C., or greater than 50° C. at a spring weight of 40 g/cm measured in accordance with the test methods described herein.

The hot tack temperature range is greater than 80° C., or greater than 75° C., or greater than 70° C., or greater than 60° C., or greater 50° C., or greater than 40° C. at a spring weight of 60 g/cm measured in accordance with the test methods described herein.

HFFS and VFFS Operating Window

Referring now to FIG. 1, the operating window for a substrate (e.g., thermoplastic film) coated with a coating composition (coated substrate) of this invention when processed on HFFS equipment is shown in which the machine speed (meters per min) is displayed as a function of sealing jaws temperature (° C.). Also shown is the operating window for a prior art coated film (prior art film). Line 1 represents the minimum sealing temperature as a function of machine speed for the coated substrate of this invention. Line 2 represents the minimum sealing temperature as a function of machine speed for a prior art film. Line 3 represents the shrinkage limit for substrates, such as thermoplastic films and is determined by a combination of maximum sealing temperature and, machine speed. Line 4 represents the maximum machine speed. Line 6 represents the machine speed of 76.20 meters/min (250 feet/min). Line 1, Line 3 and Line 4 generally define an operating window for the coated substrates of this invention when processed on high-speed HFFS equipment. Line 2, Line 3 and Line 4 generally define the operating window for the prior art film.

As can be seen in FIG. 1, the operating window for the coated substrate of this invention is much larger than that of the prior art film. This is because the minimum sealing temperature of the coated substrate of this invention is at least 40 to 50° C. less than that of the prior art film. This larger operating window and lower sealing temperature of the coated film of this invention provide several advantages. First, the lower sealing temperatures allow the high-speed HFFS and VFFS equipment to run at higher speeds. The machine speed may be increased to the machine limit of 80 meters per min without reaching the shrinkage limit for substrates, such as thermoplastic films. Second, the larger operating window allows for more flexibility to deal with operational upsets with respect to the high-speed HFFS and VFFS equipment. For example, with prior art films, if the high-speed HFFS equipment is operated near the machine limit of 80 meters per min (as shown by Point A), the shrinkage limit (Line 3) is reached when machine speeds drop below about 30 meters/min (as shown by the dotted Line 5 to Point B). All packaged product produced below this speed must be discarded. For the coated substrate of this invention, however, if the high-speed HFFS equipment is operated at the machine limit (as shown by line 4), the shrinkage limit (Line 3) is not reached at all when the machine speed drops to zero (as shown by the dotted Line 6) and no loss of packaged product is realized. In fact, the machine speed may be increased to above 100 meters/min with no operating window constraints.

EXPERIMENTAL

The present invention will be further described with reference to the following non-limiting examples.

Testing Methods

The coefficient of friction (COF) may be determined following ASTM 1894 with 10 seconds of measurement time using a Thwing-Albert (Model 225-1) slip-peel equipment.

Density may be measured according to ASTM D-1505 test method.

The procedure for Differential Scanning Calorimetry (DSC) is described as follows. From about 6 to 10 mg of a sheet of the polymer pressed at approximately 200 to 230° C. is removed with a punch die. This is annealed at room temperature for at least 2 weeks. At the end of this period, the sample is placed in a Differential Scanning Calorimeter (TA Instruments Model 2920 DSC) and cooled to about −50 to −70° C. The sample is heated at 20° C./min to attain a final temperature of about 200 to 220° C. The thermal output is recorded as the area under the melting peak of the sample which is typically peaked at about 30 to 175° C. and occurs between the temperatures of about 0 and 200° C. is a measure of the heat of fusion expressed in Joules per gram of polymer. The melting point is recorded as the temperature of the greatest heat absorption within the range of melting of the sample.

Mean particle size may be determined from the statistical volume distributions obtained from Beckman Coulter LS type Particle Size Analyzer.

Melt index may be measured at 2.16 kg, 190° C. with a 1 min preheat of the sample to provide a steady temperature for the duration of the experiment. Melt index may also be measured at 2.16 kg, 190° C. according to ASTM D-1238.

Hermetic seals may be formed using sealing devices such as a LAKO™ Heat Sealer (Model SL-10), RDM Laboratory Heat Sealer (Model HT-1000), and a FUJI™ Heat Sealer (Model Alpha V).

Hermetic seals using the RDM Laboratory Heat Sealer HT-1000 (commercially available from RDM Test Equipment Co. of Hertfordshire, United Kingdom) may be prepared as follows: the flat jaws of the RDM Laboratory Heat Sealer are heated to the specified temperature and the films to be sealed are inserted into the flat jaws and the seal is formed at a jaw pressure of 50 p.s.i. (0.345 MPa or 3.45 bars) for 0.2 seconds.

The seal strength of hermetic seals formed from flexible barrier materials may be determined according to the standard testing method of ASTM F 88-06.

The LAKO™ Heat Sealer (Model SL-10) (commercially available from Lako Tool & Manufacturing, Inc. of Perrysburg, Ohio) may be used to form a seal and evaluate its seal strength. The LAKO™ Heat Sealer is an automated film testing device that is capable of forming a film seal, determining the seal strength, and generating a seal profile from film samples. The operating range is from ambient to 199° C., sealing pressure of 0.04 to 2.69 MPa, and a dwell time of 0.2 to 20 seconds.

The seal strength of a seal formed using a FUJI™ Heat Sealer (Alpha V) machine (commercially available from Fuji Packaging Co. Ltd. of Japan) may be determined as follows: a roll of film or film lamination is placed on the machine. The crimp temperature is set at or above the MST of the film or film lamination. The lap and/or fin seal temperature is set above the MST of the film or film lamination. A total of twenty empty bags measuring approximately 35.6 cm by 13.3 cm are produced at the rate 150 bags/min Two bags are randomly selected and seal strengths are measured on a Suter tester. Preferred seal strength range is greater than 80 g/cm.

The BRUGGER™ Dynamometer (Model HSG-C) (commercially available from Brugger Feinmechanix GmbH of Munich, Germany) may be used to evaluate the seal strength based on ASTM F88-06 as follows: Seals strengths are measured on 25 mm wide strips of seals. The strips are placed on both sides in each jaw and tightened with clamps. The strips have to be placed at the seal limit but without any tension to start the readings at the beginning of the sealing area. During the reading, the sample is maintained without any constraint perpendicularly to the jaws direction. Seal strength values correspond to the "F-max" maximum values.

Minimum seal temperature (MST) may be determined as follows: heat seals are formed using one of the above heat sealers at temperatures that are raised incrementally. The minimum seal temperature is reached when one temperature yields a seal value of less than a specified g/cm. peel force and the next temperature yields a seal value of greater than or equal to the specified g/cm. peel force. Using the RDM Laboratory Heat Sealer Model HT-1000, for example, the temperatures may be increased from 45 to 85° C., in 5° C. increments. The specified peel force of the LAKO™ Heat Sealer and the FUJI™ Heat Sealer is 80 g/cm. For the Brugger Heat Sealer, the specified peel force is 300 g/cm.

MST may also be evaluated on a HFFS packaging machine operating at a fixed packaging speed. MST of a seal formed using a Jaguar Record Model HFFS packaging machine (commercially available from Jaguar Packaging Systems, Inc. of Lewiston, N.Y.) may be determined as follows: a film or film lamination is placed on the machine. The Jaguar Record machine is operated at 76 m/min (250 ft/min). The pressure applied by the jaws of the Jaguar Record machine when making seals increases as the thickness of the film increases. Packages are formed having one or more heat seals and may or may not contain a product. The minimum seal temperature of the packages form are determined in accordance with the methods described herein.

Hot tack performance may be determined using a OTTO BRUGGER™ Hot Tack machine (Model HSG ETK) (commercially available from Brugger Feinmechanix GmbH of Munich, Germany) or a LAKO™ Heat Sealer (Model SL-10), described above, as follows: new heat seals are formed using one of the above-described heat sealers at temperatures that are raised incrementally.

For measurements with the OTTO BRUGGER™ Hot Tack equipment, hot tack measurements based on ASTM D3706 were determined as follows: seals are formed around a bended springs. Typical spring weights are 20 g/cm, 40 g/cm, or 60 g/cm. The hot tack temperature range is recorded as the temperature in which less than 50% of the seal is opened by the strength of the bended spring. Preferred hot tack range temperatures are: greater than 70° C. for a 20 g/cm spring, or greater than 50° C. for a 40 g/cm spring or greater than 20° C. for a 60 g/cm spring.

For measurements with the LAKO™ Heat Sealer, immediately after seal formation, the seal is automatically peeled by an integrated dynamometer (Time between sealing and peeling is less than 1 sec). In this case, the hot tack temperature range is recorded as the range temperature in which the minimum seal strength is 59 g/cm.

EXAMPLES

Formulation 1 (Comparative)

Formulation 1 was a comparative formulation of a low temperature seal coating composition, which was prepared by adding to an aqueous solution or fine dispersion of 25 wt % of an ammonium salt of a copolymer of 80 wt % of ethylene and 20 wt % of acrylic acid, (sold by Michelman, Inc. as MICHEM™ 4983), 1.56 phr of sodium hydroxide (NaOH), 4.16 phr of microcrystalline wax having an average size of about 0.12 to 0.2 microns (sold by Michelman, Inc. as ML 215), 0.15 phr of PMMA particle with an average particle size of about 4 to 5 microns (sold by Nippon Shokubai as Epostar MA1004) and 0.003 phr of antifoam Dow 1510. All the components were added as an aqueous dispersion or solution. Water was then added to bring the final coating composition to a solids content of 16.03 wt %.

Formulation 2 (Comparative)

Formulation 2 was a comparative formulation of a very low temperature seal coating composition was prepared in the same manner as Formulation 1 (Comparative), except that the sodium hydroxide content was 1.0 phr.

Formulation 3

Formulation 3 was a coating composition of this invention, prepared by mixing 100 phr of a first aqueous dispersion, 50 phr of a second aqueous dispersion, 50 phr of a third aqueous dispersion and 12 phr of a fourth aqueous dispersion.

To prepare one sample of the first aqueous dispersion used in Formulation 3, 100 parts of a thermoplastic ethylene/1-octene copolymer with octene content of about 38 wt %, a density of about 0.87 g/cc (ASTM D-792) and a melt index of about 5 g/10 minutes (as determined according to ASTM D-1238 at 190° C. and 2.16 kg) a Mw/Mn of about 2.0, and a melting point of about 63° C. (as determined by DSC at a scanning rate of about 10° C. per minute), commercially available from The Dow Chemical Company as ENGAGE™ 8200 polyolefin elastomer, and 42.9 parts by weight of an ethylene acrylic acid copolymer (dispersing agent), available from The Dow Chemical Company under the tradename PRIMACOR™ 5980i copolymer, with a melt index of about 15 g/10 minutes as determined according to ASTM D-1238 at 125° C. and 2.16 kg (which is equivalent to about 300 g/10 min when determined according to ASTM D-1238 at 190° C. and 2.16 kg), an acrylic acid content of about 20.5 wt %, and a DSC melting point of about 77° C. are melt kneaded at 170° C. in a twin screw extruder at a rate of 8.1 kg/hr.

Upon the melt kneaded resin/dispersing agent above, 11.7 wt % aqueous solution of potassium hydroxide is continuously fed into a downstream injection port at a rate 3.0 kg/hr (at a rate of 27.1 wt % of the total mixture). This aqueous dispersion is subsequently diluted with additional water at a rate of 5.2 kg/hr before exiting the extruder. To further dilute the resulting dispersion, additional water is added at a rate of 2.6 kg/hr after the mixture exited the extruder. An aqueous dispersion having a solids content of 44.4 wt % at pH 10.0 is obtained. The dispersed polymer phase measured by a Coulter LS230 particle analyzer consisted of an average volume diameter of 1.67 micron (1167 nanometers) and a particle size distribution (Dv/Dn) of 4.79. Other samples of the first aqueous dispersion for Formulation 3 were made similarly.

To prepare one sample of the second aqueous dispersion used in Formulation 3, 50 parts by weight of a thermoplastic ethylene/1-octene copolymer with octene content of about 38 wt %, a density of about 0.87 g/cc (ASTM D-792) and a melt index of about 5 g/10 minutes (as determined according to ASTM D-1238 at 190° C. and 2.16 kg) a Mw/Mn of about 2.0, and a melting point of about 63° C. (as determined by DSC at a scanning rate of about 10° C. per minute.), commercially available from The Dow Chemical Company as ENGAGE™ 8200 polyolefin elastomer, and 3.1 parts by weight of a $C_{26}$ carboxylic acid (dispersing agent) having an acid value 115 mg KOH/g, manufactured by Baker-Petrolite as UNICID 350, are melt kneaded at 150° C. in a twin screw extruder at a rate of 10.0 kg/hr.

To the melt kneaded resin/dispersing agent above, a 13.5 wt % aqueous solution of potassium hydroxide, is continuously fed into a downstream injection port at a rate 0.25 kg/hr (which equates to 2.5 wt % of the total mixture). This aqueous dispersion is subsequently diluted in a two step process with water containing 1.5 wt % dioctyl sodium sulfosuccinate (Aerosol OT-100 manufactured by Cytec Industries) at a rate of 5.6 kg/hr, and secondly additional water added at a rate of 1.7 kg/hr before exiting the extruder. To further dilute the resulting dispersion, additional water is added at a rate of 5.2 kg/hr after the mixture exited the extruder. An aqueous dispersion having a solids content of 51.2 wt % at pH 9.7 is obtained. The dispersed polymer phase measured by a Coulter LS230 particle analyzer consisted of an average volume diameter of 0.58 micron (580 nanometers) and a particle size distribution (Dv/Dn) of 1.60. Other samples of the second aqueous dispersion for Formulation 3 were made similarly.

The second aqueous dispersions used in Formulation 3 had a solids content that ranged from 45 to 55 wt %, a mean particle size that ranged from 0.58 to 0.86 microns, and a particle size of distribution (Dv/Dn) that ranged from 1.60 to 1.94.

To prepare one sample of the third aqueous dispersion used in Formulation 3, 50 parts by weight of an ethylene acrylic acid copolymer (dispersing agent), available from The Dow Chemical Company under the tradename PRIMACOR™ 5980i copolymer, with a melt index of about 15 g/10 minutes as determined according to ASTM D-1238 at 125° C. and 2.16 kg (which is equivalent to about 300 g/10 min when determined according to ASTM D-1238 at 190° C. and 2.16 kg), an acrylic acid content of about 20.5 wt %, and a DSC melting point of about 77° C. is melt kneaded at 140° C. in a twin screw extruder at a rate of 9.1 kg/hr.

Upon the melt kneaded product above, 49 parts by weight of an aqueous solution of 26 wt % potassium hydroxide is continuously fed into a downstream injection port at a rate of 4.5 kg/hr (at a rate of 33.1 wt % of the total mixture). This aqueous dispersion is subsequently diluted with additional water at a rate of 27 kg/hr before exiting the extruder. The third aqueous dispersion having a solids content of 26.5 wt % at pH 10.0 is obtained. The dispersed polymer phase measured by a hydrodynamic chromatography analyzer consisted of an average volume diameter of 30 nanometers. Other samples of the third aqueous dispersion for Formulation 3 were made similarly.

The third aqueous dispersions used in Formulation 3 had a solids content that ranged from 25% to 26.5 wt %, a mean particle size that ranged from 20 to 30 nanometers, and a particle size of distribution (Dv/Dn) that ranged from 1.00 to 1.10.

The fourth aqueous dispersion (slip agent) was an anionic dispersion comprised of a polyethylene wax with a pH of 8.2 to 9.2, a solids content of 24.5 to 25.5 wt %, and a mean particle size of 45 nanometers, and commercially available from Michelman Inc. under the tradename MICHEM® EMULSION 20325.E.

Formulation 4

Formulation 4 was a coating composition of this invention that is prepared differently. To prepare one sample of the second aqueous dispersion used in Formulation 4, 50 parts by weight of a thermoplastic ethylene/1-octene copolymer having a density of about 0.87 g/cc (ASTM D-792) and a melt index of about 30 g/10 minutes (as determined according to ASTM D-1238 at 190° C. and 2.16 kg) a Mw/Mn of about 2.0, and a melting point of about 65° C. (as determined by DSC at a scanning rate of about 10° C. per minute.), commercially available from The Dow Chemical Company as ENGAGE™ 8407 polyolefin elastomer, and 3.1 parts by weight of a C22 (85%) carboxylic acid (dispersing agent) having an acid value of 165 mg KOH/g, manufactured by Croda, Inc. as Behenic Acid 85 (90% bead), are melt kneaded at 110° C. in a twin screw extruder at a rate of 4.56 kg/hr.

To the melt kneaded resin/dispersing agent above, a 25 wt % aqueous solution of potassium hydroxide, is continuously fed into a downstream injection port at a rate of 0.086 kg/hr. This aqueous dispersion is subsequently diluted in a two step process with water at a rate of 0.15 kg/hr, and secondly, additional water is added at a rate of 3.75 kg/hr before exiting the extruder. To further dilute the resulting dispersion, additional water containing 1.5 wt % dioctyl sodium sulfosuccinate (Aerosol OT-100 manufactured by Cytec Industries) is added at a rate of 0.18 kg/hr after the mixture exited the extruder. An aqueous dispersion having a solids content of 52.5 wt % at pH 11.0 is obtained. The dispersed polymer phase measured by a Coulter LS230 particle analyzer consisted of an average volume diameter of 0.92 microns (920 nanometers) and a particle size distribution (Dv/Dn) of 1.14. Other samples of the second aqueous dispersion for Formulation 4 were made similarly.

Formulation 5

Formulation 5 was a coating composition of this invention, prepared by mixing 100 phr of a first aqueous dispersion, 50 phr of a second aqueous dispersion, 45 phr of a third aqueous dispersion and 12 phr of a fourth aqueous dispersion.

The first aqueous dispersion is prepared as described above for Formulation 3.

The second aqueous dispersion is prepared as described above for Formulation 3.

The third aqueous dispersion is prepared as described above for Formulation 4.

The fourth aqueous dispersion (slip agent) was anionic dispersion comprised of a carnauba wax, with a pH of 9.5, a solids content of 20 wt %, a mean particle size of 120 nanometers, and commercially available from Michelman Inc. under the tradename of MICHEM™ LUBE 215 E.

Application of Coating Compositions to White Opaque Films

The Formulation 1-2 (Comparative) as well as Formulations 3-5 were applied to a white opaque film, substrate described below, and dried at temperature of 110° C. for few seconds, to yield a coating weight of 2.44 g/m².

The white opaque film substrate was a five-layer, white opaque OPP film comprised of two outer skin layers each comprised of ethylene-polypropylene-butylene terpolymer, two tie layers each comprised of propylene homopolymer, and a core layer cavitated with polybutylene terephthalate and comprised of propylene homopolymer. The white opaque, OPP film had a density of 0.62 g/cm³ and a film thickness of 38 microns. A first skin layer was corona-treated, pre-coated with a primer of polyethylene imine (PEI), and then coated with Formulations 1-5, as described above. An acrylic coating was applied to the second skin layer of the white opaque OPP film.

Hermetic seals were formed using the RDM Laboratory Heat Sealer. The seal strengths of the hermetic seals and anti-blocking properties were determined using the Brugger Dynamometer. The minimum seal temperature was determined using the RDM Heat Sealer and the Jaguar HFFS Packaging Machine in accordance with the test methods described herein. Hot tack properties were determined using the OTTO BRUGGER™ Hot Tack equipment in accordance with the test methods described herein. The coefficient of friction was determined using the Thwing-Albert slip-peel equipment in accordance with the test methods described herein.

The five-layer, white opaque OPP film coated with the Formulations 3-5 exhibited good adhesion, good wet out and good coating laydown.

As shown in Table 1A, the white opaque films coated with Formulations 3-5 of this invention exhibited good sealing properties at very low temperatures (i.e., low minimum sealing temperatures) as compared to comparative Formulations 1-2.

As shown in Table 2A, the white opaque films coated with Formulations 3-5 of this invention exhibited good hot tack characteristics as compared to Formulation (Comparative) 1 and Formulation 2 (Comparative).

As shown in Table 3A, the white opaque film coated with Formulations 3-5 exhibited good blocking characteristics as compared to the estimated values expected for Formulation 1 (Comparative) and Formulation 2 (Comparative). Also, the white opaque film coated with Formulations 3-5 exhibited significantly higher coefficients of friction on acrylic and on metal as compared to the COF values for Formulation 1 (Comparative) and Formulation 2 (Comparative). This indicated the potential need for the addition of slip agents.

Application of Coating Compositions to a Clear Film

Formulation 2 (Comparative) and Formulation 4 (Comparative) were applied to a clear film substrate, described below, and dried at a temperature of 110° C. for a few seconds to yield a coating weight of 2.44 g/m².

The clear film substrate was a five-layer, clear OPP film comprised of two outer skin layers each comprised of ethylene-polypropylene-butylene terpolymer, two tie layers each comprised of propylene homopolymer, and a clear core layer comprised of propylene homopolymer. The five-layer, clear OPP film had a film density of 0.91 g/cm³ and a film thickness of 29 microns. A first skin layer was corona-treated, pre-coated with a polyethylene imine (PEI) primer, and then coated with Formulations 2 and 4, as described above. An acrylic coating was applied to the second skin layer of the clear OPP film.

Hermetic seals were formed using the RDM Laboratory Heat Sealer. The seal strengths of the hermetic seals and anti-blocking properties were determined using the Brugger Dynamometer. The minimum seal temperature was determined using the RDM Laboratory Heat Sealer and the Jaguar HFFS Packaging Machine in accordance with the test methods described herein. Hot tack properties were determined using the Otto Brugger™ Hot Back equipment in accordance with the test methods described herein. The coefficient of friction was determined using the Thwing-Albert slip-peel equipment in accordance with the test methods described herein.

The five-layer, clear OPP film coated with Formulation 4 exhibited good adhesion, good wet out and good coating laydown.

As shown in Table 1B, the clear film coated with Formulation 4 of this invention exhibited good sealing properties at very low temperatures (i.e., minimum sealing temperatures) as compared to comparative Formulation 2.

As shown in Table 2B, the clear film coated with Formulation 4 of this invention exhibited good hot tack characteristics as compared to comparative Formulation 2.

As shown in Table 3B, the clear film coated with Formulation 4 exhibited good blocking characteristics as compared to the estimated value expected for Formulation 2 (Comparative). Also, the clear film coated with Formulation 4 exhibited higher coefficients of friction on acrylic and on metal as compared to the COF value for Formulation 2 (Comparative). This indicated the potential need for the addition of slip agents.

TABLE 1A

| White Opaque Films | Minimum Sealing Temperature (RDM) | | | | | | | | |
|---|---|---|---|---|---|---|---|---|---|
| | 45° C. | 50° C. | 55° C. | 60° C. | 65° C. | 70° C. | 75° C. | 80° C. | 85° C. |
| Formulation | Seal Strength (g/in) | | | | | | | | |
| | (g/in) | (g/in) | (g/in) | (g/in) | (g/in) | (g/in) | (g/in) | (g/in) | (g/in) |
| Formulation 1 (Comparative) | 0 | 0 | 0 | 0 | 0 | 35 | 177 | 634 | 561 |
| Formulation 2 (Comparative) | 0 | 0 | 0 | 0 | 50 | 90 | 255 | 603 | 778 |
| Formulation 3 | 18 | 13 | 85 | 345 | 510 | 700 | 815 | 758 | 790 |
| Formulation 4 | 0 | 0 | 0 | 92 | 306 | 348 | 612 | 799 | 956 |
| Formulation 5 | 0 | 0 | 0 | 0 | 16 | 38 | 137 | 554 | 917 |

TABLE 1B

| Transparent Films | Minimum Sealing Temperature (RDM) | | | | | | | | |
|---|---|---|---|---|---|---|---|---|---|
| | 45° C. | 50° C. | 55° C. | 60° C. | 65° C. | 70° C. | 75° C. | 80° C. | 85° C. |
| Formulation | Seal Strength (g/in) | | | | | | | | |
| | (g/in) | (g/in) | (g/in) | (g/in) | (g/in) | (g/in) | (g/in) | (g/in) | (g/in) |
| Formulation 2 (Comparative) | 0 | 0 | 0 | 0 | 75 | 129 | 284 | 500 | 566 |
| Formulation 4 | 0 | 0 | 0 | 50 | 151 | 259 | 350 | 578 | 639 |

TABLE 2A

| White Opaque Films Formulations | Hot Tack Properties Otto Brugger ™ HSG-C | | | Minimum Seal Temperature Jaguar HFFS at 76 m/min (° C.) |
|---|---|---|---|---|
| | 20 g/cm Spring (° C. @ <50% Op.) | 40 g/cm Spring (° C. @ <50% Op.) | 60 g/cm Spring (° C. @ <50% Op.) | |
| Formulation 1 (Comparative) | 70-140 (70 Δ° C.) | 80-130 (50 Δ° C.) | 0 | 184 |
| Formulation 2 (Comparative) | 70-130 (60 Δ° C.) | 70-110 (40 Δ° C.) | 90-110 (20 Δ° C.) | |
| Formulation 3 | 60->150 (>90 Δ° C.) | 70->150 (>80 Δ° C.) | 70-110 (40 Δ° C.) | 136 |
| Formulation 4 | 70->150 (>80 Δ° C.) | 70->150 (>80 Δ° C.) | 70->150 (>80 Δ° C.) | 139 |
| Formulation 5 | 80->150 (>70 Δ° C.) | 90->150 (>60 Δ° C.) | 90-100 (10 Δ° C.) | |

TABLE 2B

| Transparent Films Formulations | Hot Tack Properties Otto Brugger ™ HSG-C | | | Minimum Seal Temperature Jaguar HFFS at 76 m/min (° C.) |
|---|---|---|---|---|
| | 20 g/cm Spring (° C.@<50% Op.) | 40 g/cm Spring (° C@<50% Op.) | 60 g/cm Spring (° C@<50% Op.) | |
| Formulation 2 (Comparative) | 70-100 | 80 | 0 | 160 |

TABLE 2B-continued

| Transparent Films Formulations | Hot Tack Properties Otto Brugger™ HSG-C | | | Minimum Seal Temperature Jaguar HFFS at 76 m/min (° C.) |
|---|---|---|---|---|
| | 20 g/cm Spring (° C.@<50% Op.) | 40 g/cm Spring (° C@<50% Op.) | 60 g/cm Spring (° C@<50% Op.) | |
| Formulation 4 | 70->150 (>80 Δ° C.) | 80 (0 Δ° C.) | 0 (0 Δ° C.) | 153 |

TABLE 3A

| White Opaque Films Formulation | Blocking on Metal Brugger™ HSG-C Dynamometer at 60° C. (g/in) | Coefficient Of Friction on Acrylic Unitless | Coefficient Of Friction on Metal Unitless |
|---|---|---|---|
| Formulation 1 (Comparative) | Estimation: >200-250 | 0.4 | 0.25 |
| Formulation 2 (Comparative) | Estimation: >200-250 | 0.4 | 0.25 |
| Formulation 3 | 55 | 1.44 | 0.87 |
| Formulation 4 | 36 | 1.04 | 0.67 |
| Formulation 5 | 12 | 0.77 | 0.57 |

TABLE 3B

| Transparent Films Formulation | Blocking on Metal Brugger™ HSG-C Dynamometer at 60° C. (g/in) | Coefficient Of Friction on Acrylic Unitless | Coefficient Of Friction on Metal Unitless |
|---|---|---|---|
| Formulation 2 (Comparative) | Estimation: >200 | 0.4 | 0.2 |
| Formulation 4 | 93 | 0.54 | 0.63 |

Measurements of coefficient of friction were made with a Thwing-Albert (Model 225-1) slip-peel equipment.

What is claimed is:

1. A coating composition, comprising:
   a) a first liquid,
   b) a first ethylene copolymer and second ethylene copolymer dispersed in the first liquid, the mean particle size of the dispersion in the range from 400 to 1200 nanometers; and
   c) a second liquid with a second polymer dispersed in the second liquid, said second polymer having a mean particle size of less than 50 nanometers, said second polymer comprises at least 5 wt % of the total combined weight of the first polymer and the second polymer.

2. The coating composition of claim 1, further comprising a dispersing agent, wherein the liquid comprises water, and wherein the second polymer is selected from the group consisting of an ethylene-acrylic acid copolymer, an ionized salt of the ethylene-acrylic acid copolymer, an ethylene-methacrylic acid copolymer, an ionized salt of the ethylene-methacrylic acid copolymer, and mixtures thereof.

3. The coating composition of claim 2, wherein the first and second ethylene copolymers are dispersed in a first aqueous dispersion and the second copolymer is dispersed in a second aqueous dispersion.

4. The coating composition of claim 1, further comprising a slip agent.

5. The coating composition of claim 4, wherein the slip agent has a mean particle size of less than 130 nanometers.

6. The coating composition of claim 4, wherein the slip agent comprises a polyethylene wax, a paraffin wax, a microcrystalline wax, a beeswax, a carnauba wax, a montan wax, a candelilla wax, or mixtures thereof.

7. The coating composition of claim 1, wherein the mean particle size of the first ethylene copolymer is less than 1000 nanometers.

8. The coating composition of claim 2, wherein the first ethylene copolymer comprises ethylene and an alpha-olefin having less than 20 carbon atoms.

9. The coating composition of claim 8, wherein the alpha-olefin is 1-octene.

10. The coating composition of claim 9, wherein the first ethylene copolymer comprises ethylene and 1-octene and has a melt index of less than 35 g/10 min measured in accordance with ASTM D1238.

11. The coating composition of claim 2, wherein the first ethylene copolymer comprises ethylene and a first alpha olefin, and
   wherein the second ethylene copolymer has a second mean particle size and comprises ethylene and a second alpha-olefin, and
   wherein the second alpha-olefin has less than 20 carbon atoms.

12. The coating composition of claim 11, wherein the second alpha-olefin is 1-octene.

13. The coating composition of claim 12, wherein the first ethylene copolymer and the second ethylene copolymer have a melt index of less than 10 g/10 min measured in accordance with ASTM D1238.

14. The coating composition of claim 12, wherein the first ethylene copolymer comprises ethylene and 1-octene, has a mean particle size of less than 1100 nanometers and a melt index of less than 10 g/10 min measured in accordance with ASTM D1238,
wherein the second ethylene copolymer comprises ethylene and 1-octene, has a mean particle size of less than 850 nanometers and a melt index of less than 35 g/10 min measured in accordance with ASTM D1238.

15. The coating composition of claim 11, wherein the first alpha-olefin and the second alpha-olefin are different.

16. The coating composition of claim 2, wherein the dispersing agent comprises a copolymer selected from the group consisting of an ethylene-acrylic acid copolymer, an ionized salt of the ethylene-acrylic acid copolymer, an ethylene-methacrylic acid copolymer, an ionized salt of the ethylene-methacrylic acid copolymer, a fatty acid, a ionized salt of a fatty acid, and mixtures thereof.

17. The coating composition of claim 16, wherein the dispersing agent is ethylene-acrylic acid copolymer ionized with potassium hydroxide or montanic acid ionized with potassium hydroxide.

18. The coating composition of claim 3, wherein the mean particle size of the second aqueous dispersion is less than 40 nanometers.

19. The coating composition of claim 2, wherein the second polymer comprises at least 10 wt % of the total combined weight of the first ethylene copolymer, second ethylene copolymer and the second polymer.

20. The coating composition of claim 2, wherein the second polymer comprises at least 15 wt % of the total combined weight of the first ethylene copolymer, second ethylene copolymer and the second polymer.

21. The coating composition of claim 1, further comprising an anti-block agent.

22. The coating composition of claim 21, wherein the anti-block agent is selected from the group consisting of a polymethylmethacrylate particles, silicone particles, colloidal silica, fumed silica particles, silicone gum, talc, finely-divided clay, and mixtures thereof.

23. The coating composition of claim 22, wherein the mean particle size of the anti-block agent is from 0.5 to 10 microns.

24. The coating composition of claim 1, further comprising a coalescent and wetting agent.

25. The coating composition of claim 24, wherein the coalescent and wetting agent is selected from the group consisting of a hexyl or benzyl ether of ethylene glycol, a hexyl ether of diethylene glycol, a butyl alcohol, a hexyl alcohol, an octyl alcohol, diacetone alcohol, a non-ionic surfactant, an anionic surfactant, and mixtures thereof.

26. The coating composition of claim 1, further comprising a primer.

27. The coating composition of claim 26, wherein the primer is selected from the group consisting of polyethylene imine (PEI) resin, a crosslinked epoxy resin, and a polyurethane resin.

28. A coating composition, comprising:
(a) a first aqueous dispersion having a mean particle size in the range from 400 to 1200 nanometers, wherein the first aqueous dispersion comprises a first copolymer and a dispersing agent,
wherein the first copolymer comprises a copolymer of ethylene and an alpha-olefin having less than 20 carbon atoms,
wherein the dispersing agent comprises a copolymer selected from the group consisting of an ethylene-acrylic acid copolymer, an ionized salt of the ethylene-acrylic acid copolymer, an ethylene-methacrylic acid copolymer, an ionized salt of the ethylene-methacrylic acid copolymer, a fatty acid, a ionized salt of a fatty acid and mixtures thereof;
(b) a second aqueous dispersion having a mean particle size of less than 50 nanometers,
wherein the second aqueous dispersion is comprised of a second copolymer selected from the group consisting of an ethylene-acrylic acid copolymer, an ionized salt of the ethylene-acrylic acid copolymer, an ethylene-methacrylic acid copolymer, an ionized salt of the ethylene-methacrylic acid copolymer, and mixtures thereof; and
wherein the second copolymer comprises at least 5 wt % of the combined total weight of the first copolymer and the second copolymer.

* * * * *